(12) United States Patent
Miyazoe et al.

(10) Patent No.: US 11,913,553 B2
(45) Date of Patent: Feb. 27, 2024

(54) SPOOL-TYPE SWITCHING VALVE

(71) Applicant: SMC CORPORATION, Chiyoda-ku (JP)

(72) Inventors: Shinji Miyazoe, Moriya (JP); Kazuhiro Noguchi, Tsukubamirai (JP)

(73) Assignee: SMC CORPORATION, Chiyoda-ku (JP)

( * ) Notice: Subject to any disclaimer, the term of this patent is extended or adjusted under 35 U.S.C. 154(b) by 195 days.

(21) Appl. No.: 17/429,995

(22) PCT Filed: Feb. 17, 2020

(86) PCT No.: PCT/JP2020/005947
§ 371 (c)(1),
(2) Date: Aug. 11, 2021

(87) PCT Pub. No.: WO2020/170994
PCT Pub. Date: Aug. 27, 2020

(65) Prior Publication Data
US 2022/0146001 A1    May 12, 2022

(30) Foreign Application Priority Data

Feb. 21, 2019 (JP) ................................. 2019-029785

(51) Int. Cl.
*F16K 11/07* (2006.01)
*F16K 3/24* (2006.01)

(52) U.S. Cl.
CPC ............ *F16K 11/0712* (2013.01); *F16K 3/24* (2013.01); *F16K 11/0716* (2013.01)

(58) Field of Classification Search
CPC ......... F16K 11/0712; F16K 11/07; F16K 3/24
See application file for complete search history.

(56) References Cited

U.S. PATENT DOCUMENTS

| | | |
|---|---|---|
| 4,291,890 A | 9/1981 | Walker |
| 5,934,323 A | 8/1999 | Akimoto et al. |
| (Continued) | | |

FOREIGN PATENT DOCUMENTS

| | | |
|---|---|---|
| CN | 105899858 A | 8/2016 |
| EP | 2 016 314 A1 | 1/2009 |
| (Continued) | | |

OTHER PUBLICATIONS

International Search Report dated Apr. 14, 2020 in PCT/JP2020/005947 filed Feb. 17, 2020, 2 pages.

(Continued)

*Primary Examiner* — Kelsey E Cary
(74) *Attorney, Agent, or Firm* — Oblon, McClelland, Maier & Neustadt, L.L.P.

(57) ABSTRACT

In a spool-type switching valve in which a recessed groove in which a packing is mounted is provided at a land portion of a spool, a groove bottom of the recessed groove is formed of an inclined surface that has an axial length half or larger than the length of the groove bottom in the direction of an axis and that continuously decreases in diameter from an upstream end to a downstream end, the inner periphery of the packing is brought into pressure-contact with the groove bottom with stress concentration at a pressure contact point that defines an upstream end of the inclined surface, and an angle $\theta$ that a connection surface connecting the pressure contact point on the groove bottom and the upstream end forms with the axis is within the range of $0° \leq \theta \leq \alpha$, where $\alpha$ is an angle that the inclined surface forms with the axis.

10 Claims, 12 Drawing Sheets

(56) References Cited

U.S. PATENT DOCUMENTS 8,567,443 B2 10/2013 Miyazoe et al.
2017/0211703 A1 7/2017 Hatano

FOREIGN PATENT DOCUMENTS

| JP | 55-36751 | 3/1980 |
| JP | 61-48978 U | 4/1986 |
| JP | 62-126663 U | 8/1987 |
| JP | 6-147337 A | 5/1994 |
| JP | 7-269733 A | 10/1995 |
| JP | 8-170743 A | 7/1996 |
| JP | 10-267141 A | 10/1998 |
| JP | 2010-249186 A | 11/2010 |
| KR | 2000-0009945 A | 2/2000 |
| WO | WO 2006/120528 A2 | 11/2006 |

OTHER PUBLICATIONS

Extended European Search Report dated Sep. 15, 2022 in European Patent Application No. 20758809.6, 11 pages.
Combined Chinese Office Action and Search Report dated Feb. 1, 2023 in Chinese Application 202080015343.9, (English Translation), 13 pages.

(a)

(b)

(c)

(a)

(b)

(c)

(a)

(b)

(c)

(a)

(b)

(c)

(a)

(b)

(c)

SPOOL-TYPE SWITCHING VALVE

TECHNICAL FIELD

The present invention relates to a spool-type switching valve in which a spool is slidably housed in a spool hole.

BACKGROUND ART

Spool-type switching valves are well known which include an air supply port for connecting to a fluid pressure source, an output port for outputting compressed fluid from the fluid pressure source to an external device, such as various kinds of actuators, and an exhaust port for discharging exhaust air returned from the various kinds of actuators and which switch the communication state among the ports by operating the spool serving as a valve element in a spool hole to which the ports are connected.

In such spool-type switching valves, the spool is formed by alternately disposing a land portion serving as a valve and a ring-shaped recess constituting a communication path among the ports next to each other in the axial direction. The inner surface of the spool hole is formed by alternately disposing a ring-shaped valve seat (valve seat surface) that blocks the communication between adjacent ports by slidably fitting the land portion thereon by the operation of the spool and a ring-shaped recessed groove that constitutes the communication path between adjacent ports together with the ring-shaped recess by positioning the land portion during the communication between the ports next to each other in the axial direction.

The sliding portion (sliding surface) of the outer circumferential end of the land portion has a ring-shaped recessed groove. The recessed groove is fitted with a ring-shaped packing that seals the space between it and the valve seat in the spool hole, with the inner periphery in contact with the groove bottom of the recessed groove, thereby preventing the compressed fluid from leaking though the space between the sliding portion and the valve seat when the communication among the ports is blocked.

However, if the compressed fluid flows between the groove bottom of the recessed groove and the inner periphery of the packing in the recessed groove, various problems can occur, for example, the inner periphery of the packing rises from the groove bottom of the recessed groove to make the packing prone to separate from the bottom of the recessed groove, and the sliding resistance of the packing to the valve seat is increased.

Accordingly, in order to reduce the inflow of compressed fluid between the groove bottom of the recessed groove and the inner periphery of the packing, various propositions have been made about the structure for mounting the packing in the recessed groove, mainly the form of the packing, as shown in PTL 1, for example. However, it is hard to say that sufficient consideration has been made because of the structure of the recessed groove.

CITATION LIST

Patent Literature

PTL 1: Japanese Unexamined Patent Application Publication No. 6-147337

SUMMARY OF INVENTION

Technical Problem

A technical object of the present invention is to reduce, in a spool-type switching valve in which a recessed groove in which a packing is mounted is provided at the land portion of a spool, the inflow of compressed fluid between the bottom of the recessed groove and the inner periphery of the packing as much as possible by improving the structure of the recessed groove.

Solution to Problem

To achieve the object, the present invention provides a spool-type switching valve, wherein the switching valve includes a spool hole extending in an axial direction to which at least a pair of channels through which compressed fluid flows is connected; a spool inserted in the spool hole so as to be movable in the axial direction; and a valve drive member that operates the spool in the axial direction to switch a state of communication between the channels, wherein the spool includes a land portion serving as a valve portion including a ring-shaped sliding portion around an outer periphery about the axis and a small-diameter portion smaller in outside diameter than the land portion next to each other in the axial direction, wherein the sliding portion of the land portion has a ring-shaped recessed groove that is open in a radial direction, and a ring-shaped packing made of an elastic material is housed in the recessed groove, wherein, in an inner surface of the spool hole, a ring-shaped valve seat at which the land portion is fitted slidably in the axial direction, with its sliding portion facing the inner surface, and a ring-shaped large-diameter portion that is larger in inside diameter than the valve seat are formed next to each other in the axial direction, and the pair of channels are connected to opposite sides of the valve seat in the axial direction, wherein communication between the pair of channels can be switched by an operation of the spool between a state in which the land portion is disposed at the large-diameter portion and the small-diameter portion is disposed at the valve seat so that the pair of channels communicate with each other and a state in which the land portion is disposed at the valve seat so that the communication between the pair of channels is blocked, wherein the ring-shaped recessed groove includes a groove bottom and a pair of side wall surfaces, wherein the groove bottom includes an upstream end disposed at, of the pair of channels, a channel through which compressed fluid flows into the spool hole in the axial direction and a downstream end disposed at a channel through which the compressed fluid flows out of the spool hole when the pair of channels communicate with each other, and wherein the pair of side wall surfaces are vertically erected from the upstream end and the downstream end of the groove bottom and opposed to each other, wherein the groove bottom of the recessed groove includes an inclined surface having an axial length half or larger than an axial length of the groove bottom and continuously decreasing in diameter from the upstream end to the downstream end, and wherein an inner periphery of the packing is brought into pressure-contact with the groove bottom with stress concentration at a pressure contact point that defines an end at the upstream end of the inclined surface, and wherein an angle θ that a connection surface connecting the pressure contact point and the upstream end of the groove bottom forms with the axis is within a range of $0° \leq θ \leq α$, where α is an angle that the inclined surface forms with the axis.

The inclined surface and the connection surface of the groove bottom are preferably linear in a cross section of the recessed groove. The angle α that the inclined surface forms with the axis is preferably within a range of $10° \leq α$. The inner periphery of the packing is preferably in pressure-contact with the pressure contact point of the groove bottom at a portion adjacent to the upstream end with respect to its center.

In the spool-type switching valve according to the present invention, preferably, the packing includes a pair of opposing side surfaces connected to opposite ends of the inner periphery in a width direction, and, in the recessed groove, of the pair of side surfaces of the packing, a downstream side surface disposed at the downstream end is normally in contact with a downstream wall surface vertically erected from the downstream end of the groove bottom of the pair of side wall surfaces of the recessed groove.

The inner periphery of the packing preferably has a linear shape parallel to the axis in a cross section of the packing in a state not mounted in the recessed groove. More preferably, the cross section of the packing not mounted in the recessed groove is symmetrical about a center line extending in a radial direction through the center of the inner periphery. Still more preferably, a pair of side surfaces of the packing has a linear shape that gradually comes close to the center line with a decreasing distance from the inner periphery to the outer periphery in the cross section of the packing not mounted in the recessed groove.

In the spool-type switching valve according to the present invention, the pair of side wall surfaces of the recessed groove preferably extend in a direction orthogonal to the axis. The outside diameter of the packing may be equal to or larger than the inside diameter of the valve seat of the spool hole in a state in which the packing is mounted in the recessed groove. The channels connected to the spool may include an air supply channel, an output channel, and an exhaust channel, wherein the output channel may be connected between the air supply channel and the exhaust channel in the axial direction. Of the channels, the pair of channels may be the output channel and the exhaust channel. The output channel may be an upstream channel through which the compressed fluid flows into the spool hole, and the exhaust channel may be a downstream channel through which the compressed fluid flows out of the spool hole.

Advantageous Effects of Invention

As described above, in the present invention, the bottom of the recessed groove in which the packing is mounted at the land portion of the spool includes an inclined surface having an axial length half or larger than the axial length of the groove bottom and continuously decreasing in diameter from the upstream end to the downstream end, and the inner periphery of the packing is brought into pressure-contact with the groove bottom with stress concentration at a pressure contact point that defines an end at the upstream end of the inclined surface. Moreover, an angle θ that a connection surface connecting the pressure contact point and the upstream end of the groove bottom forms with the axis is within the range of 0°≤θ≤α, where α is an angle that the inclined surface forms with the axis.

This reduces the inflow of compressed fluid between the bottom of the recessed groove and the inner periphery of the packing as much as possible, thereby preventing various adverse effects due to the inflow of the compressed fluid, in particular, the inner periphery of the packing from rising from the bottom of the recessed groove, so that the packing is separated from the bottom of the recessed groove. This may also reduce other adverse effects, such as an increase in sliding resistance.

DESCRIPTION OF EMBODIMENTS

Figure 1:
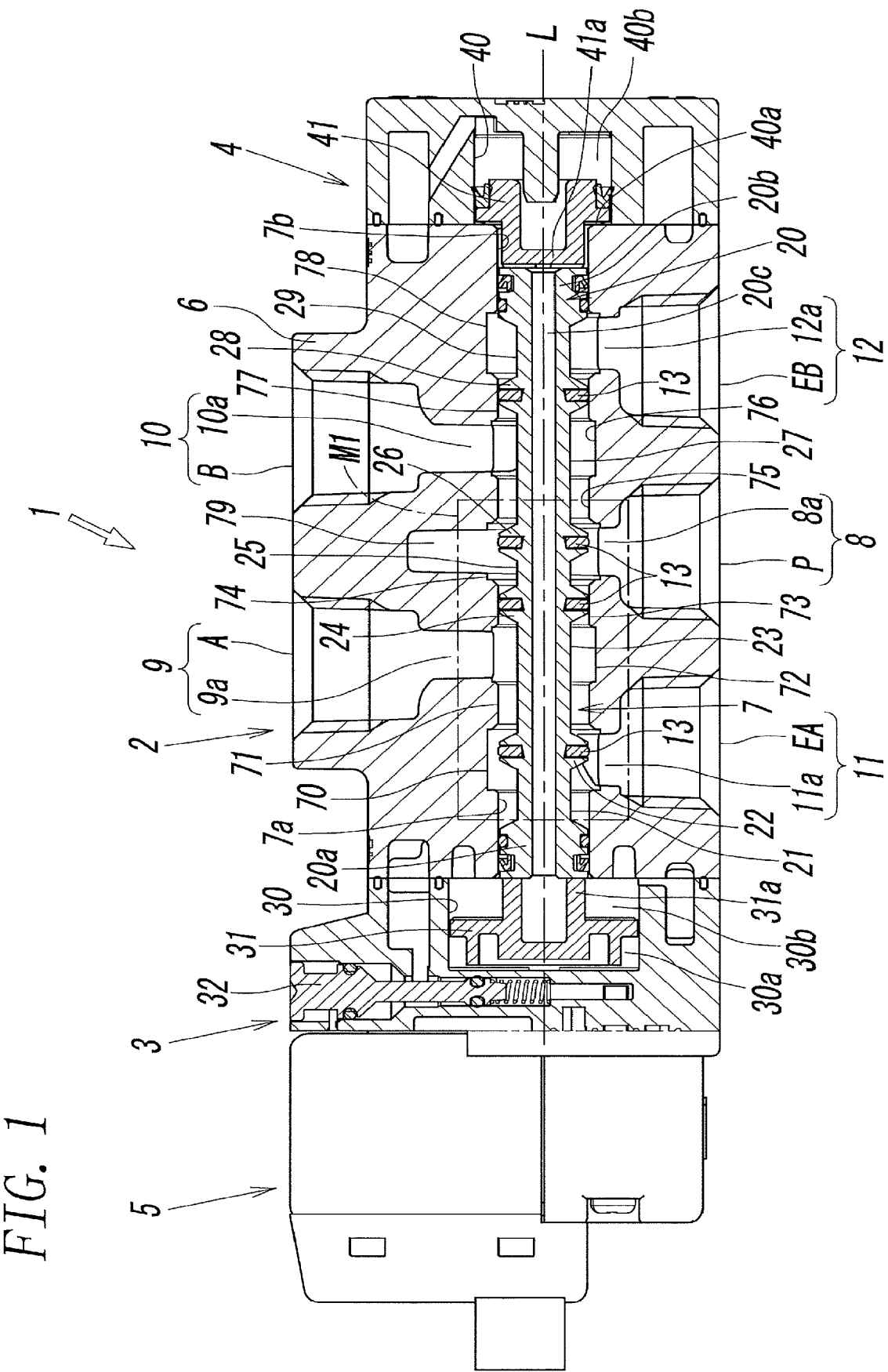
FIG. 1 is a schematic cross-sectional view of an embodiment of a spool-type switching valve according to the present invention along the axis, illustrating a state in which a spool has changed in position to a first switching position.

A spool-type switching valve 1 according to an embodiment of the present invention includes a spool hole 7 extending in the direction of an axis L, an air supply channel 8, output channels 9 and 10 and exhaust channels 11 and 12 connected to the spool hole 7, a spool 20 serving as a main valve inserted in the spool hole 7 so as to be slidable in the direction of the axis L, and a valve drive member 5 for operating the spool 20. The connection state among the output channels 9 and 10, the air supply channel 8, and the exhaust channels 11 and 12 can be selectively switched by displacing the spool 20 in the spool hole 7 with the valve drive member 5. The air supply channel 8 is used to supply compressed fluid, such as compressed air, from a fluid pressure source (not shown, for example, a compressor) to the spool hole 7. The output channels 9 and 10 are used to output the compressed fluid supplied to the spool hole 7 to various kinds of fluid pressure device, such as a fluid pressure actuator (for example, a pneumatic cylinder) driven by the compressed fluid. The exhaust channels 11 and 12 are used to discharge exhaust air from the fluid pressure device to the outside, such as the atmosphere.

Specifically, as shown in FIGS. 1 to 4, the spool-type switching valve 1 is an electromagnetic valve (an electromagnetic-pilot-type switching valve), which includes a valve main element 2 including the spool hole 7, the air supply channel 8, the output channels 9 and 10, the exhaust channels 11 and 12, and the spool 20, a first adaptor 3 and a second adaptor 4 connected to opposite end faces of the valve main element 2 in the direction of the axis L, and an electromagnetic pilot valve, which is the valve drive member 5, connected to a side end face of the first adaptor 3 opposite to the valve main element 2.

The valve main element 2 includes a housing 6 integrally formed of resin or metal in the shape of a substantially rectangular parallelepiped. The spool hole 7 passes between the opposite end faces of the housing 6 in the longitudinal direction. In the flat surface (the upper surface) of the housing 6, output ports A and B forming the output channels 9 and 10, respectively, are open. Pipes to the fluid pressure device can be connected to the output ports A and B. The bottom surface (the lower surface) opposite to the flat surface has an air supply port P which is for connecting a channel (or a pipe) from the fluid pressure source and which forms the air supply channel 8, and exhaust ports EA and EB which are for connecting channels (or pipes) that discharge exhaust air returned from the fluid pressure device through the output ports A and B and which form the exhaust channels 11 and 12, respectively.

The output ports A and B are connected to the spool hole 7 through output communication paths 9a and 10a which are smaller in channel cross-sectional area than the output ports A and B, respectively. The output ports A and B and the output communication paths 9a and 10a form the output channels 9 and 10, respectively. The air supply port P is connected to the spool hole 7 through an air supply communication path 8a which is smaller in channel cross-sectional area than the air supply port P. The air supply port P and the air supply communication path 8a form the air supply channel 8. The exhaust ports EA and EB communicate with the spool hole 7 through exhaust air communication paths 11a and 12a which are smaller in channel cross-sectional area than the exhaust ports EA and EB, respectively. The exhaust ports EA and EB and the exhaust air communication paths 11a and 12a form the exhaust channels 11 and 12, respectively.

More specifically, the spool-type switching valve 1 includes five ports: the one air supply port P disposed at the center of the bottom of the housing 6, the first exhaust port EA and the second exhaust port EB disposed next to each other on opposite sides of the air supply port P in the longitudinal direction of the bottom of the housing 6, and the first output port A and the second output port B disposed side by side in the longitudinal direction at the flat surface of the housing 6. The spool 20 can be selectively moved between two switch positions, a first switching position (see FIG. 1) at which the air supply port P communicates with the second output port B and the first output port A communicates with the first exhaust port EA and a second switching position (see FIG. 2) at which the air supply port P communicates with the first output port A and the second output port B communicates with the second exhaust port EB, by turning on or off the electromagnetic pilot valve (the valve drive member) 5.

The inner surface of the spool hole 7 is formed of a first support surface 7a, a first channel groove 70, a first valve seat surface 71, a second channel groove 72, a second valve seat surface 73, a third channel groove 74, a third valve seat surface 75, a fourth channel groove 76, a fourth valve seat surface 77, a fifth channel groove 78, and a second support surface 7b in sequence in the direction of the axis L from the opening of one side edge face at which the first adaptor 3 is mounted to the opening of the other side edge face at which the second adaptor 4 is mounted. They are formed in a ring shape centered on the axis L. In other words, the inner surface of the spool hole 7 has the ring-shaped valve seat surfaces (valve seats) and the ring-shaped channel grooves (large-diameter portions), which are recessed grooves, alternately next to each other along the axis L.

Figure 3:
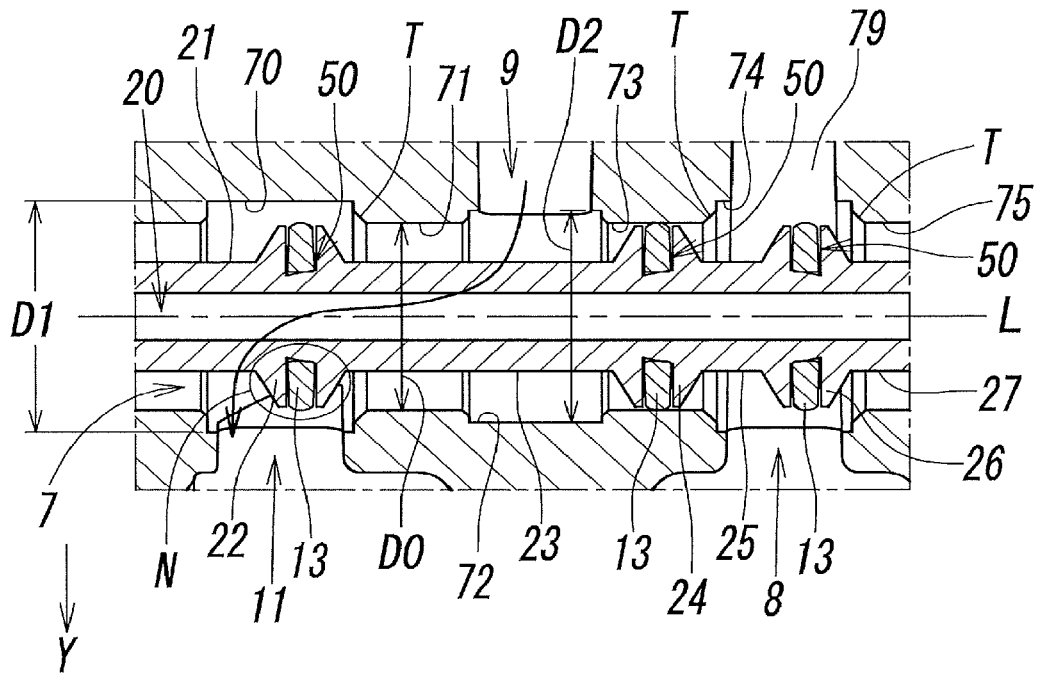
FIG. 3 is an enlarged view of a portion M1, which is the main part of the valve main element in the state of FIG. 1, illustrating a state in which a first land portion has moved to an open position at which a first output channel and a first exhaust channel communicate.
Figure 4:
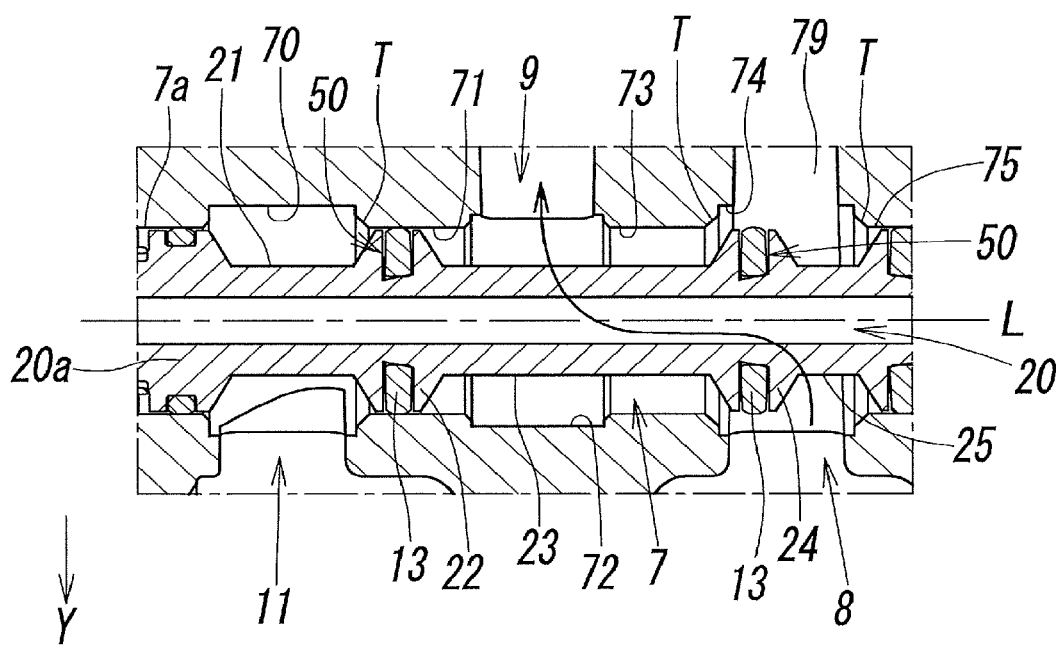
FIG. 4 is an enlarged view of a portion M2, which is the main part of the valve main element in the state of FIG. 2, illustrating a state in which the first land portion has moved to a closed position at which the communication between the first output channel and the first exhaust channel is blocked.

The inside diameters D0 of the first and second support surfaces 7a and 7b and the first to fourth valve seat surfaces 71, 73, 75, and 77 are equal to each other. The inside diameters D1 of the groove bottoms of the first, third, and fifth channel grooves 70, 74, and 78 are equal to each other. The inside diameters D2 of the groove bottoms of the second and fourth channel grooves 72 and 76 are equal to each other. The inside diameter D1 is slightly larger than the inside diameter D2. The inside diameters D1 and D2 of the groove bottoms are larger than the inside diameters D0 of the valve seat surfaces and so on in the range smaller than the width of the housing 6. The opening edge of the first channel groove 70 connecting to the first valve seat surface 71, the opening edges of the third channel groove 74 connecting to the second and third valve seat surfaces 73 and 75, and the opening edge of the fifth channel groove 78 connecting to the fourth valve seat surface 77 each have a tapered portion T that expands in the width of the channel groove toward the opening (radially inward), as shown in FIGS. 3 and 4.

One end (a first pressed portion 20a) and the other end (a second pressed portion 20b) of the spool 20 are airtightly and slidably supported by the first support surface 7a and the second support surface 7b formed of the inner surface of the spool hole 7, respectively. The communication path 11a of the first exhaust channel 11 is connected to the groove bottom of the first channel groove 70. The communication path 9a of the first output channel 9 is connected to the groove bottom of the second channel groove 72. The communication path 8a of the air supply channel 8 is connected to the groove bottom of the third channel groove 74. The communication path 10a of the second output channel 10 is connected to the groove bottom of the fourth channel groove 76. The communication path 12a of the second exhaust channel 12 is connected to the groove bottom of the fifth channel groove 78. Reference sign 79 in the drawing denotes a pilot-fluid supply hole for supplying pilot fluid to the first adaptor 3 or the second adaptor 4 through a pilot channel (not shown) through the valve drive member 5. The pilot-fluid supply hole 79 communicates with the air supply channel 8 all the time.

Meanwhile, the spool 20 is formed of the first pressed portion 20a airtightly and slidably fitted to the first support surface 7a, a first ring-shaped recess 21, a first land portion 22, a second ring-shaped recess 23, a second land portion 24, a third ring-shaped recess 25, a third land portion 26, a fourth ring-shaped recess 27, a fourth land portion 28, a fifth ring-shaped recess 29, and a second pressed portion 20b, which is airtightly and slidably fitted to the second support surface 7b, from one end adjacent to the first adaptor 3 to the other end adjacent to the second adaptor 4 sequentially in the direction of the axis L. They are formed in a ring shape centered on the axis L. In other words, the spool 20 has these ring-shaped recesses (small-diameter portions) and land portions, which are valve portions, alternately along the axis L.

The outer shape of each of the land portions 22, 24, 26, and 28 is substantially isosceles trapezoidal of which the width in the direction of the axis L decreases gradually from opposite base ends connected to the adjacent ring-shaped recesses to the ring-shaped sliding portion (sliding surface) formed of an outer peripheral end in the radial direction Y and is symmetrical in the direction of the axis L with respect to the central axis in the radial direction. As shown in FIGS. 3 and 4 and FIGS. 6 and 7, the sliding surfaces of the land portions 22, 24, 26, and 28 each have a ring-shaped recessed groove 50 whose groove bottom 51 is formed of an inclined surface 52 and which is open in a radial direction Y. Each of the recessed grooves 50 of the land portions 22, 24, 26, and 28 houses a ring-shaped packing 13 shown in FIG. 5. In the first and second land portions 22 and 24 and the third and fourth land portions 26 and 28, the flow of compressed fluid is opposite (in other words, symmetrical). Therefore, the inclination directions of the groove bottoms 51 are also opposite to each other between the recessed grooves 50 of the first and second land portions 22 and 24 and the recessed grooves 50 of the third and fourth land portions 26 and 28.

This allows, when each land portion is slidably fitted on the valve seat of the spool hole 7 (in other words, disposed at the position of the valve seat surface), and the sliding portion (sliding surface) faces the valve seat surface, the void formed between the sliding portion of the land portion and the valve seat surface of the spool hole 7 to be sealed by the packing 13 to reduce or prevent leakage of the compressed fluid through the void as much as possible.

In other words, this embodiment is configured such that, when the sealing member, such as the packing 13, is not mounted, the outside diameters D3 of the first and second pressed portions 20a and 20b and the first to fourth land portions 22, 24, 26, and 28 (the outside diameters of the sliding portions) are equal to one another, the outside diameters D4 of the first to fifth ring-shaped recesses 21, 23, 25, 27, and 29 (the outside diameters of the small-diameter portions) are equal to one another, the outside diameters D3 of the land portions are slightly smaller than the inside diameters D0 of the valve seat surfaces and so on and larger than the outside diameters D4 of the ring-shaped recesses.

The first adaptor 3 includes, on the axis L, a first cylinder hole 30 larger in diameter than the spool hole 7 and open to the valve main element 2 and a first piston 31 airtightly fitted in the cylinder hole 30 and slidable in the direction of the axis L. In other words, the cylinder hole 30 is airtightly divided by the piston 31 into a first chamber 30a nearer to the valve drive member 5 than the piston 31 and a second chamber 30b nearer to the valve main element 2. The first piston 31 integrally includes a first pressing portion 31a coaxial with the spool 20 on the valve main element 2 side. The first pressing portion 31a is smaller in diameter than the first support surface 7a of the spool hole 7 and is in contact with an end face of the first pressed portion 20a of the spool 20. The first chamber 30a is connected to the pilot valve of the valve drive member 5. The second chamber 30b is normally open to the atmosphere. Reference sign 32 in FIG. 1 denotes a manually operating portion to be manually pushed from the outside to exhaust the compressed fluid in the first chamber 30a.

In contrast, the second adaptor 4 includes, on the axis L, a second cylinder hole 40 which is larger in diameter than the spool hole 7 and smaller in diameter than the first cylinder hole 30 which is open to the valve main element 2 and a second piston 41 airtightly fitted in the cylinder hole 40 and slidable in the direction of the axis L. In other words, the cylinder hole 40 is airtightly divided by the piston 41 into a first chamber 40a closer to the valve main element 2 than the piston 41 and a second chamber 40b opposite thereto. The diameter of the first piston 31 is larger than the diameter of the second piston 41. The pressure receiving area of the first piston 31 adjacent to the first chamber 30a is larger than the pressure receiving area of the second piston 41 adjacent to the second chamber 40b.

The second piston 41 integrally includes a second pressing portion 41a coaxial with the spool 20 on the valve main element 2 side. The second pressing portion 41a is smaller in diameter than the second support surface 7b of the spool hole 7 and is in contact with an end face of the second pressed portion 20b of the spool 20. The first chamber 40a in the second cylinder hole 40 communicates with the second chamber 30b in the first cylinder hole 30 through a through-hole 20c passing through the center of the spool 20 in the direction of the axis L and is normally open to the atmosphere. Meanwhile, the second chamber 40b normally communicates with the pilot-fluid supply hole 79 and is normally pressed by the pilot fluid. Therefore, the spool 20 is normally urged to the first adaptor 3 (in other words, to the first piston) in the direction of the axis L by the second piston 41.

The support surfaces of the spool hole 7, the channel grooves, the valve seat surfaces, the pressed portions of the spool 20, the land portions, the ring-shaped recesses, the cylinder holes 30 and 40, and the pistons 31 and 41 need not have a circular shape and may have an elliptical shape or a track shape in a cross section orthogonal to the axis L. In the present application, for ring shapes about the axis L, a chord crossing the axis L at right angles is referred to as "diameter", and the distance from the axis L to the outer periphery is referred to as "radius" for convenience.

Next, the operation of the spool-type switching valve 1 will be described with reference to FIGS. 1 to 4. First, as shown in FIG. 1, when the electromagnetic pilot valve constituting the valve drive member 5 is OFF, the first chamber 30a in the first cylinder hole 30 is open to the atmosphere. Therefore, the second piston 41 moves the first piston 31 together with the spool 20 to a stroke end adjacent to the first chamber 30a with its pressure force, and as a result, the spool 20 is switched to the first switching position. At that time, in the direction of the axis L, the first land portion 22 of the spool 20 is disposed at the position of the first channel groove 70 of the spool hole 7, the second land portion 24 is disposed at the position of the second valve seat surface 73, the third land portion 26 is disposed at the position of the third channel groove 74, and the fourth land portion 28 is disposed at the position of the fourth valve seat surface 77.

In other words, in the spool hole 7, the communication between the first output channel 9 and the air supply channel 8 is blocked by the second land portion 24, and the communication between the second output channel 10 and the second exhaust channel 12 is blocked by the fourth land portion 28. Such positional relationship between the spool hole 7 and the spool 20 allows the first output channel 9 and the first exhaust channel 11 to communicate with each other through the spool hole 7 and also the second output channel 10 and the air supply channel 8 to communicate with each other through the spool hole 7. At that time, the second exhaust channel 12 is closed in the spool hole 7.

Figure 2:
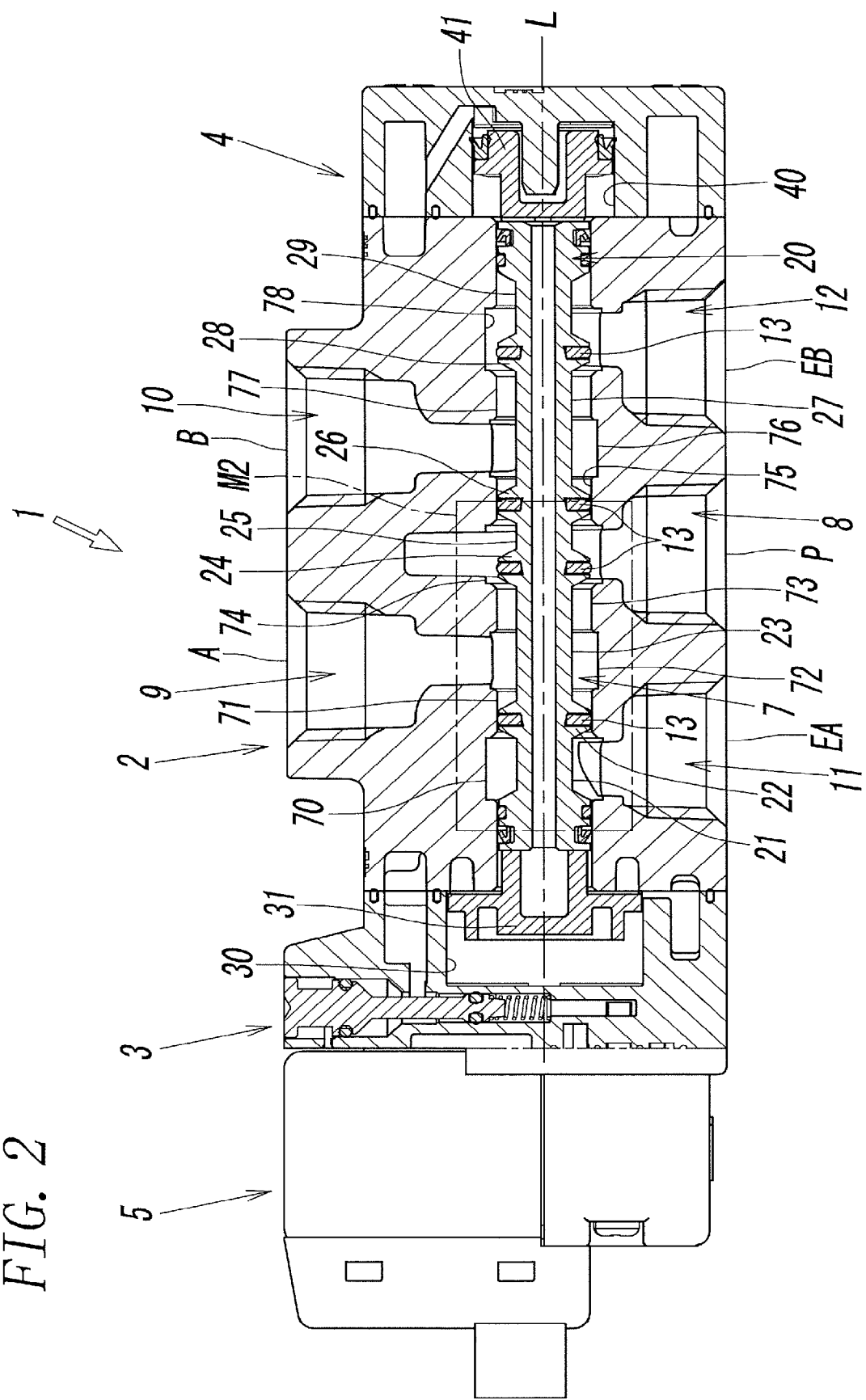
FIG. 2 illustrates the spool-type switching valve in FIG. 1 in which the spool has changed in position to a second switching position.

In contrast, as shown in FIG. 2, when the electromagnetic pilot valve constituting the valve drive member 5 is ON, pilot fluid is supplied to the first chamber 30a in the first cylinder hole 30 through the valve drive member 5. Therefore, the first piston 31 moves the second piston 41 together with the spool 20 toward a stroke end adjacent to the second cylinder hole 40 in the second chamber 40*b* with its pressure force against the pressure force of the second piston 41, and as a result, the spool 20 is switched to the second switching position. At that time, in the direction of the axis L, the first land portion 22 of the spool 20 is disposed at the position of the first valve seat surface 71 of the spool hole 7, the second land portion 24 is disposed at the position of the third channel groove 74, the third land portion 26 is disposed at the position of the third valve seat surface 75, and the fourth land portion 28 is disposed at the position of the fifth channel groove 78.

In other words, in the spool hole 7, the communication between the first output channel 9 and the first exhaust channel 11 is blocked by the first land portion 22, and the communication between the second output channel 10 and the air supply channel 8 is blocked by the third land portion 26. Such positional relationship between the spool hole 7 and the spool 20 allows the first output channel 9 and the air supply channel 8 to communicate with each other through the spool hole 7 and also the second output channel 10 and the second exhaust channel 12 to communicate with each other through the spool hole 7. At that time, the first exhaust channel 11 is closed in the spool hole 7.

Next, referring to FIGS. 3 to 13, the structure for mounting the packing 13 in the ring-shaped recessed groove 50 in the spool-type switching valve 1 and its operational advantages will be specifically described. In this embodiment, the structure of the valve main element 2 substantially symmetrical about the center in the direction of the axis L, and the flow of the compressed fluid between the channels (ports) is also substantially symmetrical. For this reason, to avoid duplicated descriptions, the structure for mounting the packing 13 in the recessed groove 50 and its operational advantages will be described in relation to the flow of compressed fluid from the first output channel 9 to the first exhaust channel 11 and the flow of compressed fluid from the air supply channel 8 to the first output channel 9 caused by the displacement of the spool 20.

Figure 5:
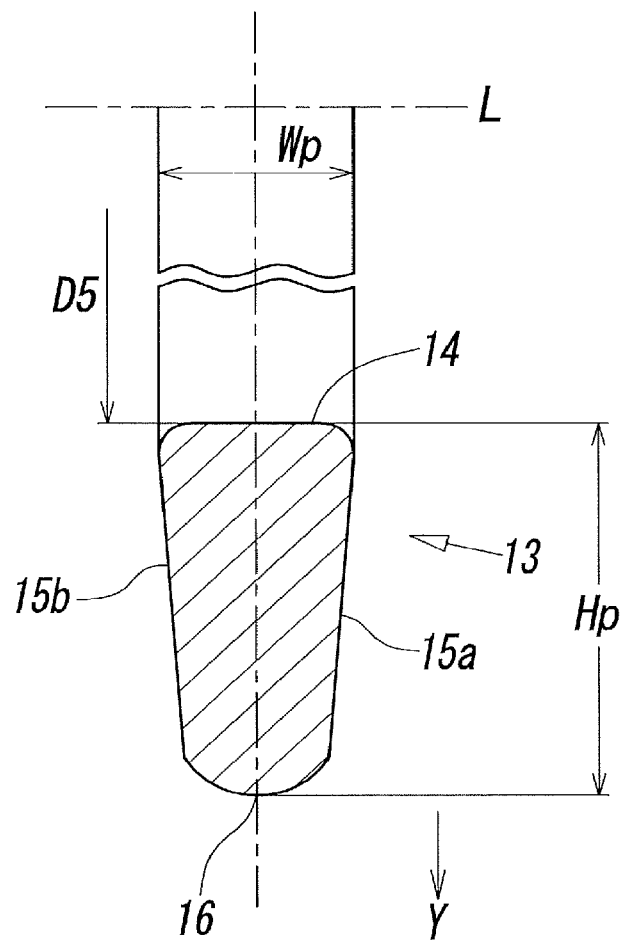
FIG. 5 is a cross-sectional view of a packing.

As shown in FIG. 5, the ring-shaped packing 13 of this embodiment has an inner periphery 14 around the axis L, a pair of side surfaces 15*a* and 15*b* ends of which are connected to opposite ends of the inner periphery in the direction of the axis L (width direction) and which extends in the radial direction Y orthogonal to the axis L, and an outer periphery (sealing surface) 16 which connects the other ends of the pair of side surfaces 15*a* and 15*b* to each other. The packing 13, when not mounted in the recessed groove 50 of the land portion, is symmetrical about the central axis extending in the radial direction Y through the center of the inner periphery 14 in its cross section and is formed in a tapered shape (in a wedge shape) that gradually decreases in the width in the direction of the axis L from the inner periphery to the outer periphery.

Specifically, the inner periphery 14 is shaped like a ring with a diameter D5 around the axis L and extends flatly along the axis L (in other words, linearly in cross section). The pair of side surfaces 15*a* and 15*b* are flat inclined surfaces (in other words, linear in cross section) inclined in the direction toward the central axis from the inside diameter side to the outside diameter side and are opposed to each other. The sealing surface 16 formed of the outer periphery forms a curve protruding in the radial direction Y, preferably, a circular arc. The maximum width Wp of the packing 13 in cross section is smaller than the height Hp. The material of the packing 13 may be any rubber elastic material that exhibits a sealing function, for example, nitrile rubber or fluorine-containing rubber.

The structure for mounting the packing 13 to the spool-type switching valve 1 according to this embodiment will be more specifically described hereinbelow with reference to an example in which such a packing 13 is mounted in a conventional recessed groove 50A formed in the first land portion 22 and an example in which the packing 13 is mounted in the recessed groove 50 according to this embodiment formed in the land portion 22.

As described above, the first exhaust channel 11 and the first output channel 9 are connected to the opposite portions of the inner surface of the spool hole 7 in the direction of the axis L (the first channel groove 70 and the second channel groove 72), with the first valve seat surface 71 with which the first land portion 22 comes into and out of contact therebetween. When the spool 20 is at the first switching position, the land portion 22 is at "open position (in the range of the channel groove 70 in the direction of the axis L)" at which the exhaust channel 11 and the output channel 9 communicate, as shown in FIG. 3. When the spool 20 is at the second switching position, the land portion 22 is at "closed position (in the range of the valve seat surface 71 in the direction of the axis L)" at which the communication between the exhaust channel 11 and the output channel 9 is blocked, as shown in FIG. 4. In other words, for the first land portion 22, the output channel 9 through which the compressed fluid flows into the spool hole 7 is a channel connected to the "upstream side" of the flow of the compressed fluid in the direction of the axis L, and the exhaust channel 11 through which the compressed fluid is discharged from the spool hole 7 is a channel connected to the "downstream side" of the flow of the compressed fluid in the direction of the axis L.

Figure 13:
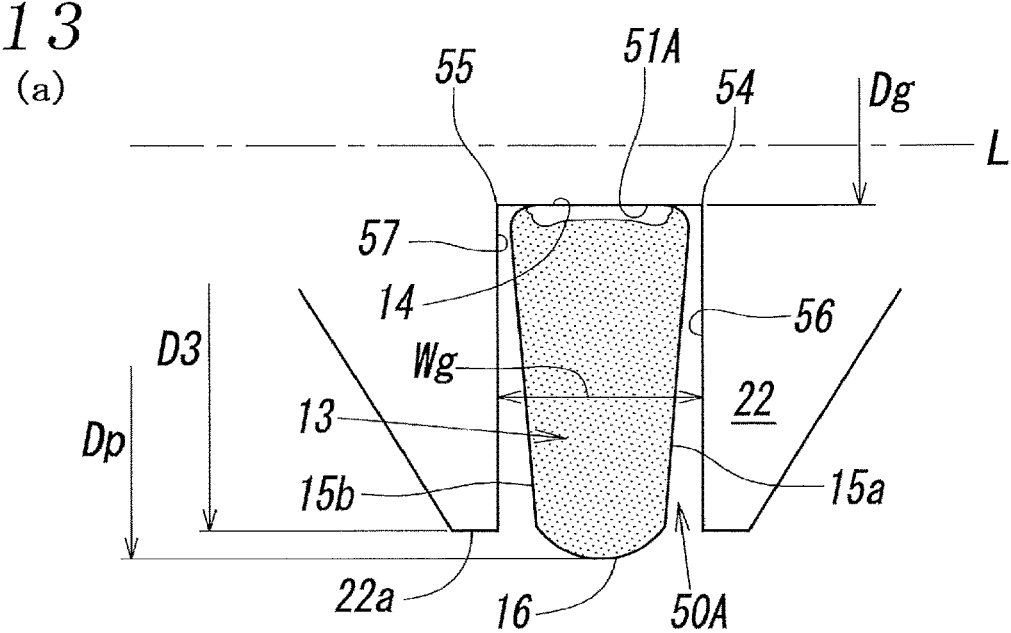
FIG. 13 illustrates reference simulation results on the distribution of the stress of a packing with a conventional packing mount structure
Figure 13:
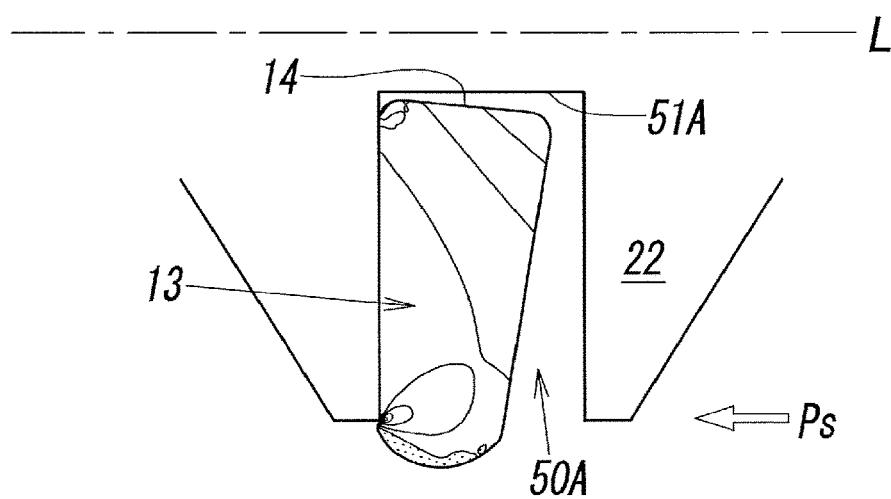
Figure 13:
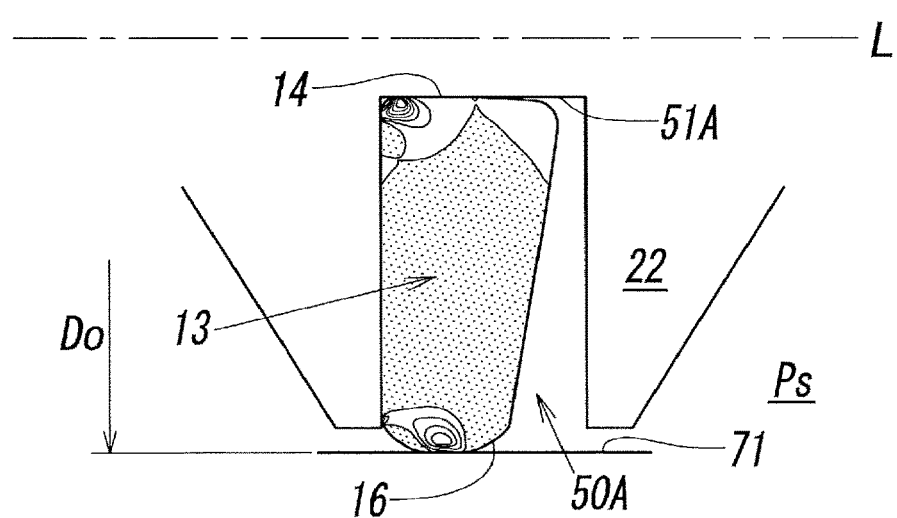

FIG. 13 illustrates a state in which the packing 13 is mounted in the conventional general recessed groove 50A formed at the first land portion 22. This conventional recessed groove 50A is formed of a groove bottom 51A shaped like a ring about the axis L and extending flatly along the axis L (in other words, linearly in cross section) and a pair of opposing side wall surfaces 56 and 57 formed vertically erected in the radial direction Y from the opposite ends 54 and 55 of the groove bottom 51A in the direction of the axis L. The sliding portion (sliding surface) 22*a* formed of the outer periphery of the land portion 22 and the pair of parallel flat side wall surfaces 56 and 57 cross each other at right angles to form the opening of the recessed groove 50A around the outer periphery of the land portion 22. In other words, the recessed groove 50A is shaped like a rectangle that is symmetrical about the central axis extending in the radial direction Y through the center of the groove bottom 51A in cross section and having a groove width Wg in the direction of the axis L.

For the flow of the compressed fluid in the direction of the axis L in FIG. 13, the right in the direction of the axis L is the upstream side on which the channel (the first output channel 9) through which the compressed fluid flows into the spool hole 7 is disposed, and the left in the direction of the axis L is the downstream side on which the channel (the first exhaust channel 11) through which the compressed fluid is discharged from the spool hole 7. Accordingly, of the opposite ends of the groove bottom 51A in the direction of the axis L of the recessed groove 50A of the first land portion 22, the end at the right in the drawing is the upstream end 54, and the end at the left in the drawing is the downstream end 55. Of the pair of side wall surfaces 56 and 57, the side wall surface at the right in the drawing is the upstream wall surface 56, and the side wall surface at the left in the drawing is the downstream wall surface 57. In the packing 13, of the pair of side surfaces 15a and 15b, the side surface at the right in the drawing is an upstream side 15a, and the side surface at the left in the drawing is a downstream side 15b.

The diameter Dg of the groove bottom 51A of the recessed groove 50A is larger than the original inside diameter of the packing 13 (the diameter of the inner periphery 14) D5 when the packing 13 is not mounted in the recessed groove 50A. In other words, the circumferential length of the inner periphery 14 of the packing 13 is smaller than the circumferential length of the groove bottom 51A. For this reason, when the packing 13 is mounted in the recessed groove 50A, the packing 13 made of a rubber elastic material is extended in the circumferential direction, so that the inner periphery 14 is elastically brought into pressure-contact with the groove bottom 51A. In the state in which the packing 13 is mounted in the recessed groove 50A, the outside diameter Dp of the packing 13 is larger than the outside diameter D3 of the sliding surface 22a of the land portion 22 and equal to or larger than the inside diameter D0 of the valve seat surface 71. The sealing surface 16 of the packing 13 therefore protrudes from the sliding surface 22a of the land portion 22 in the radial direction Y, and when the land portion 22 is at the closed position, is slidably in contact with the valve seat surface 71 of the spool hole 7. The width Wg of the recessed groove 50A is larger than the original width Wp of the packing (see FIG. 5).

In FIGS. 13(a) to (c), the curves shown in the cross section of the packing 13 are stress contour lines indicating the inner stress (inner compression stress) of the packing 13, and the dotted area (hereinafter referred to as "dotted area") is an area in which the inner stress (including tensile stress) is the smallest in each drawing. The range of the stress in the dotted area is common among the drawings. In the areas with no dots (hereinafter referred to as "no-dotted areas"), the stress widths between adjacent stress contour lines are equal. Therefore, the rate of increase in inner stress increases as the interval between adjacent stress contour lines decreases. The more crossing the no-dotted area enclosed by adjacent stress contour lines, starting from the dotted area, the larger the inner stress becomes.

Of FIG. 13, (a) illustrates the mount state of the packing 13 and the simulation result of the distribution of the inner stress in a state in which the land portion 22 is at the open position, and the fluid pressure of the compressed fluid is not acting on the packing 13 (in other words, a state in which the compressed fluid is not flowing around land portion 22). The inner periphery 14 is brought into pressure-contact with the groove bottom 51A substantially uniformly over the entire width, and the inner stress generated at the inner periphery 14, in other words, contact pressure acting on the inner periphery 14 from the groove bottom 51A, is dispersed substantially uniformly over the entire width to become small.

(b) illustrates a simulation result showing a state in which the land portion 22 is similarly at the open position, and compressed fluid with a pressure Ps (=0.7 MPa) flows from the upstream side (the first output channel 9) of the land portion 22 to the downstream side (the first exhaust channel 11), and its fluid pressure is acting on the packing 13. In (a), the contact pressure acting on the inner periphery 14 is dispersed substantially uniformly over the entire width. For this reason, the entire inner periphery 14 rises from the groove bottom 51A because of the difference between an inward force in the radial direction Y acting on the packing 13 by the compressed fluid and an outward force in the radial direction Y acting on the packing 13 by the fluid pressure of the compressed fluid flowing between the inner periphery 14 and the groove bottom 51A in the recessed groove 50A. As a result, the amount of protrusion of the outer periphery of the packing 13 from the sliding surface 22a is larger than that in the state of (a). This may cause the packing 13 to come off the recessed groove 50A, for example, when the outer periphery of the packing 13 runs on the valve seat surface 71 in the process of displacement of the land portion 22 from the open position to the closed position with the displacement of the spool 20.

(c) illustrates a simulation result showing a state in which the land portion 22 is at the closed position, the sealing surface of the packing 13 is in contact with the valve seat surface 71 (in other words, the compressed fluid is not flowing around the land portion 22, and the fluid pressure Ps of the compressed fluid is acting on the packing 13 from the upstream side. In this case, the compressed fluid flows between the end of the inner periphery 14 adjacent to the upstream end 54 of the groove bottom 51A (in other words, on the upstream side of the compressed fluid) and the groove bottom 51A to cause rising. Such rising can increase the contact pressure acting between the sealing surface 16 of the packing 13 and the valve seat surface 71 to cause an increase in the sliding resistance of the packing 13, which may have adverse effects, such as a decrease in the length of life of the packing.

For the second land portion 24, the air supply channel 8 through which the compressed fluid is flows into the spool hole 7 is a channel connected to the "upstream side" of the flow of the compressed fluid in the direction of the axis L, and the first output channel 9 through which the compressed fluid flows out of the spool hole 7 is a channel connected to the "downstream side" of the flow of the compressed fluid in the direction of the axis L. In other words, for the first land portion 22 and the second land portion 24, the positional relationship between the upstream side and the downstream side in the direction of the axis L, that is, the direction of the flow of the compressed fluid in the direction of the axis L are the same (in the drawing, from right to left). Accordingly, also the packing 13 mounted in the second land portion 24 obtains substantially the same result as that of the packing 13 at the first land portion 22 shown in FIGS. 13(a) to (c), which can cause substantially the same adverse effects as those of the packing 13 at the first land portion 22 described above.

However, the packing 13 at the first land portion 22 runs on the first valve seat surface 71 while moving from the downstream side of the compressed fluid to the upstream side (from the left to the right in FIG. 13). Accordingly, the direction of the fluid pressure Ps that acts on the packing 13 and the direction of a colliding force that acts on the packing 13 at the running-on coincide with each other. In contrast, the packing 13 at the second land portion 24 runs on the second valve seat surface 73 while moving from the upstream side to the downstream side of the compressed fluid (from right to left in FIG. 13). Accordingly, the direction of the fluid pressure Ps that acts on the packing 13 and the direction of the colliding force that acts on the packing 13 are opposite from each other. Accordingly, the packing 13 at the first land portion 22 is more likely to come off than the packing 13 at the second land portion 24.

Figure 6:
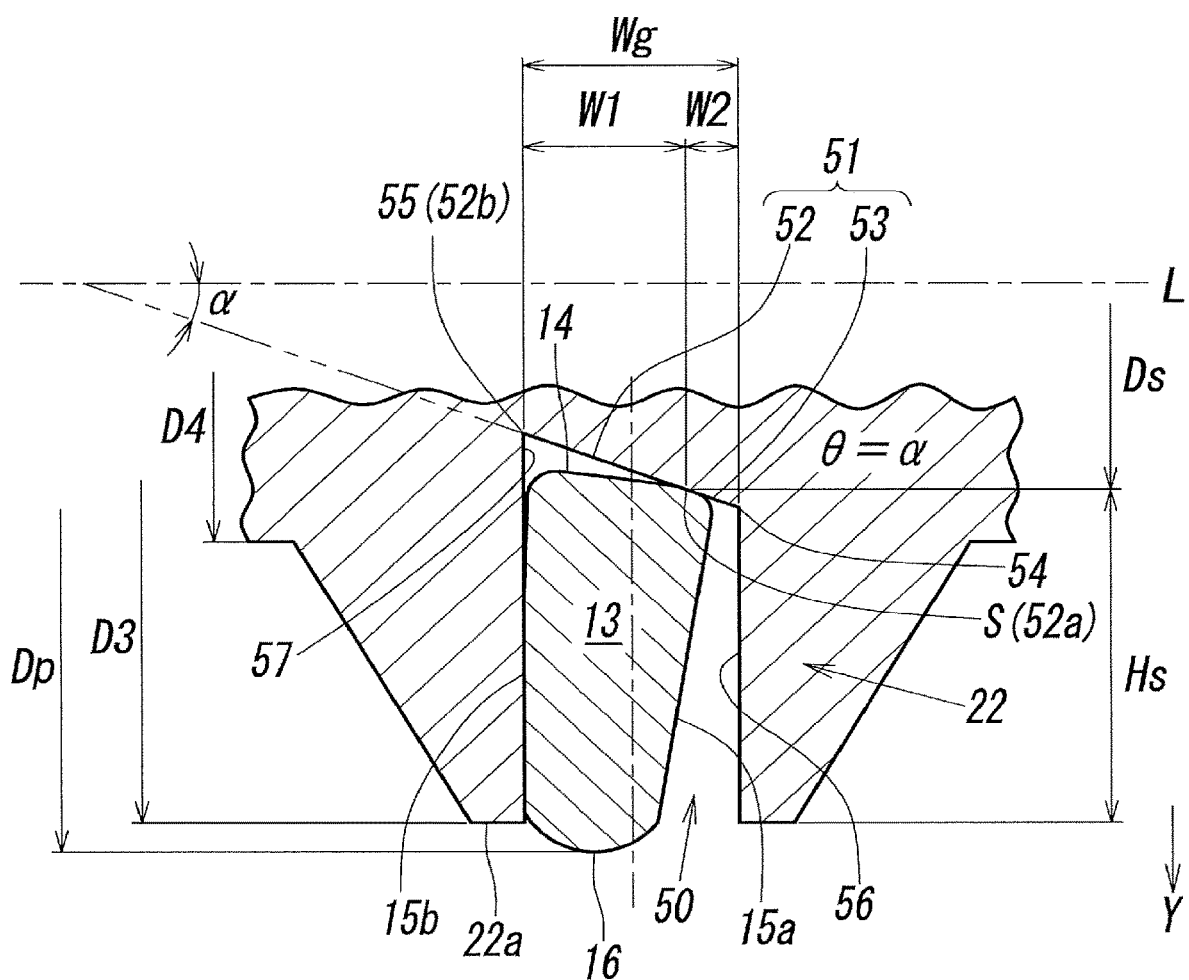
FIG. 6 is a portion N in FIG. 3, illustrating an example of a structure for mounting the packing in the recessed groove of the land portion of the spool.
Figure 7:
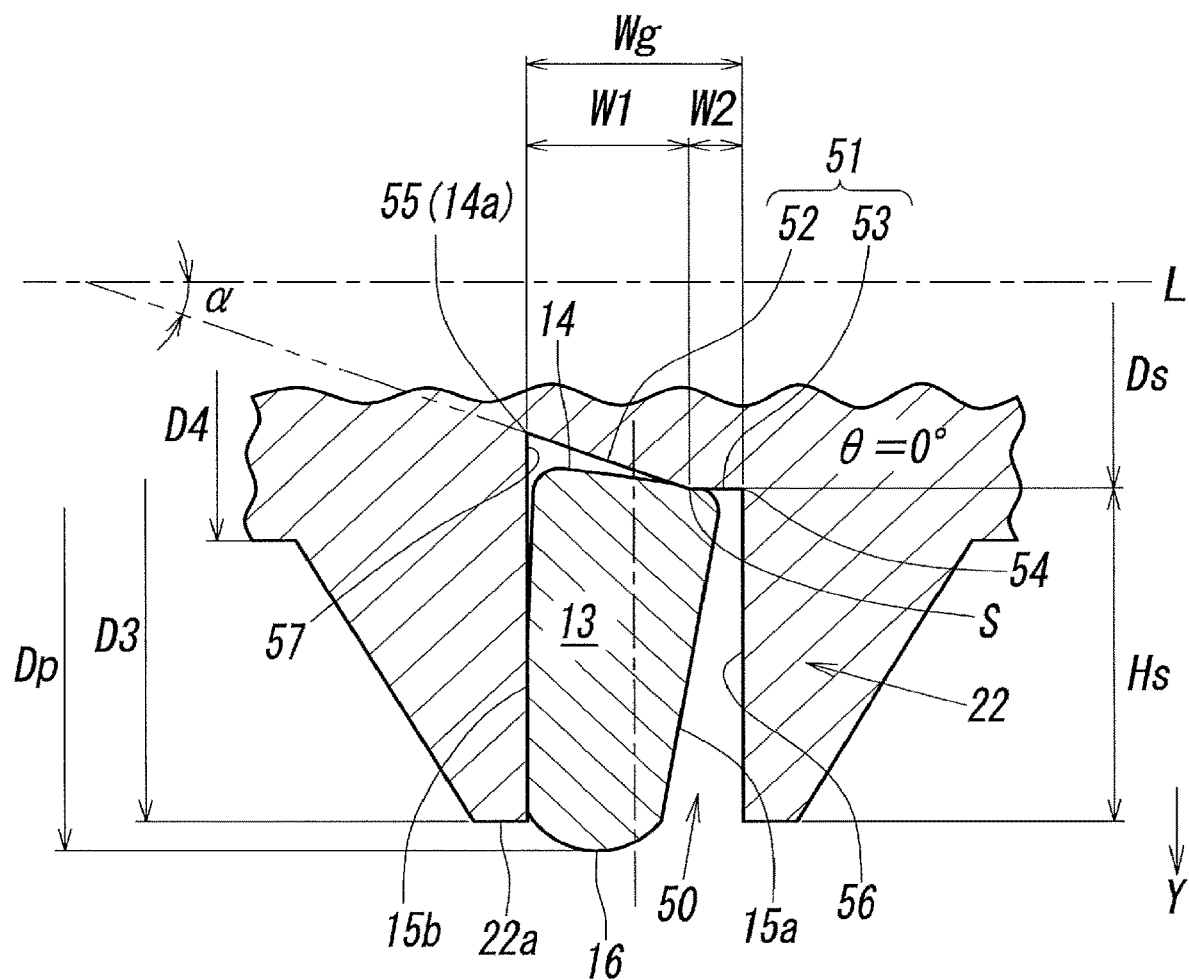
FIG. 7 illustrates a modification of the structure for mounting the packing in FIG. 6.

For that reason, in this embodiment, the groove bottom 51 of the recessed groove 50 for the packing 13 at each land portion is provided with the inclined surface 52, as shown in FIGS. 6 and 7, so that the contact pressure acting between the groove bottom 51 of the recessed groove 50 and the inner periphery 14 of the packing 13 are concentrated to a specific portion (in other words, a specific portion of the inner periphery 14 of the packing 13 is brought into pressure-contact with a specific portion of the groove bottom 51 concentrically with the maximum value of contact pressure), thereby preventing the compressed fluid from flowing between the inner periphery 14 and the groove bottom 51. At that time, concentration of stress (stress concentration) caused by the contact pressure to the groove bottom 51 occurs at the specific portion of the inner periphery 14, as will be described later in detail.

The recessed groove 50 is formed of a ring-shaped groove bottom 51 formed about the axis L and a pair of side wall surfaces 56 and 57 formed vertically erected in the radial direction Y from the opposite ends 54 and 55 of the groove bottom 51 in the direction of the axis L and facing each other. The sliding portion (sliding surface) 22a formed of the outer periphery of the land portion 22 and the pair of parallel flat side wall surfaces 56 and 57 cross at right angles to form the opening of the recessed groove 50 around the outer periphery of the land portion 22. The original maximum width Wp of the packing 13 shown in FIG. 5 is smaller than the groove width Wg of the recessed groove 50 in the direction of the axis L and larger than half of the groove width Wg.

In FIGS. 6 to 12, as in the case of FIG. 13, for the flow of the compressed fluid in the direction of the axis L, the right in the direction of the axis L is the upstream side on which the channel (the first output channel 9) through which the compressed fluid flows into the spool hole 7 is disposed, and the left in the direction of the axis L is the downstream side on which the channel (the first exhaust channel 11) through which the compressed fluid is discharged from the spool hole 7 is disposed. Accordingly, of the opposite ends of the groove bottom 51 in the direction of the axis L of the recessed groove 50 of the first land portion 22, the end at the right in the drawing is the upstream end 54, and the end at the left in the drawing is the downstream end 55. Of the pair of side wall surfaces 56 and 57, the side wall surface on the right in the drawing is the upstream wall surface 56, and the side wall surface at the left in the drawing is the downstream wall surface 57. Also for the packing 13, of the pair of side surfaces 15a and 15b, the side surface on the right in the drawing is the upstream side 15a, and the side surface on the left in the drawing is the downstream side 15b.

As shown in FIGS. 6 and 7, the inclined surface 52 included in the groove bottom 51 of the recessed groove 50 is formed in a length W1 in the direction of the axis L, which is half or larger than the length of the groove bottom 51 in the direction of the axis L (in other words, the groove width of the recessed groove 50) Wg, and decreases in diameter continuously (in this embodiment, linearly in cross section) from the upstream end 54 toward the downstream end 55.

This inclined surface 52 includes a first end 52a adjacent to the upstream end 54 and a second end 52b adjacent to the downstream end 55 and forms an acute angle α with respect to the axis. The first end 52a is defined by a pressure contact point S at which a specific portion of the inner periphery 14 of the packing 13 is brought into pressure-contact with the groove bottom 51 with the maximum value of contact pressure (in other words, with concentration of stress (stress concentration)), and the second end 52b is defined by the downstream end 55 of the groove bottom 51.

In other words, the diameter D5 of the groove bottom 51 at the pressure contact point S (the first end 52a of the inclined surface 52) is larger than the original diameter D5 of the inner periphery 14 of the packing 13 shown in FIG. 5. This causes the packing 13 made of a rubber elastic material, when mounted to the recessed groove 50, to be extended in the circumferential direction to bring a portion of the inner periphery 14 close to the upstream side 15a with respect to the center into pressure-contact with the pressure contact point S of the groove bottom 51 elastically and concentrically.

The groove bottom 51 further includes a connection surface 53 connecting the pressure contact point S and the upstream end 54. This connection surface 53 is formed linearly in cross section at an acute angle θ with respect to the axis L and has a length W2 in the direction of the axis L. The groove width Wg of the recessed groove 50 is equal to the sum of the axial length W1 of the inclined surface 52 and the axial length W2 of the connection surface 53. In FIG. 6, the angle θ of the connection surface 53 with respect to the axis L is α, which is the same as that of the inclined surface 52, and the groove bottom 51 is inclined at a fixed angle from the upstream end 54 to the downstream end 55. In FIG. 7, the angle θ is 0°. However, the angle θ of the connection surface 53 is not limited to the two kinds of angle and may be any angle within the range of 0°≤θ≤α. The packing 13 whose inner periphery 14 is brought into pressure-contact with the groove bottom 51 is mounted in the recessed groove 50, with the downstream side 15b in contact with the downstream wall surface 57 of the recessed groove 50 all the time.

As in the case of FIG. 13 described above, the outside diameter Dp of the packing 13 is larger than the outside diameter D3 of the sliding surface 22a of the land portion 22 and equal to or larger than the inside diameter D0 of the valve seat surface 71. Accordingly, the sealing surface 16 of the packing 13 protrudes in the radial direction Y from the sliding surface 22a of the land portion 22 and, when the land portion 22 is in the closed position, is slidably brought into contact with the valve seat surface 71 of the spool hole 7.

FIGS. 8 to 11 are stress contour drawings showing simulation results of the distribution of the inner stress (inner compression stress) of the packing 13 mounted in the recessed groove 50 of the land portion 22 in this embodiment, in which "dotted area" indicates an area in which the inner stress (including tensile stress) is the smallest in each drawing, as described for FIG. 13. The stress ranges of the dotted areas are common among the stress drawings including FIG. 13. Also for the no-dotted areas, the stress width between adjacent stress contour lines is equal to each other and common among the stress drawings including FIG. 13.

In FIGS. 8 to 11, (a) illustrates a state in which the land portion 22 is at the open position, and the fluid pressure of the compressed fluid is not acting on the packing 13 (in other words, no compressed fluid is flowing around the land portion 22), (b) illustrates a simulation result showing a state in which the land portion 22 is at the open position, and compressed fluid with a pressure Ps (=0.7 MPa) flows from the upstream side of the land portion 22 (the first output channel 9) to the downstream side (the first exhaust channel 11), so that its fluid pressure is acting on the packing 13, and (c) illustrates a state in which the land portion 22 is at the closed position, so that the sealing surface of the packing 13 is in contact with the valve seat surface 71 (in other words, no compressed fluid flows around the land portion 22), and the fluid pressure Ps of the compressed fluid is acting on the packing 13 from the upstream side.

Figure 8:
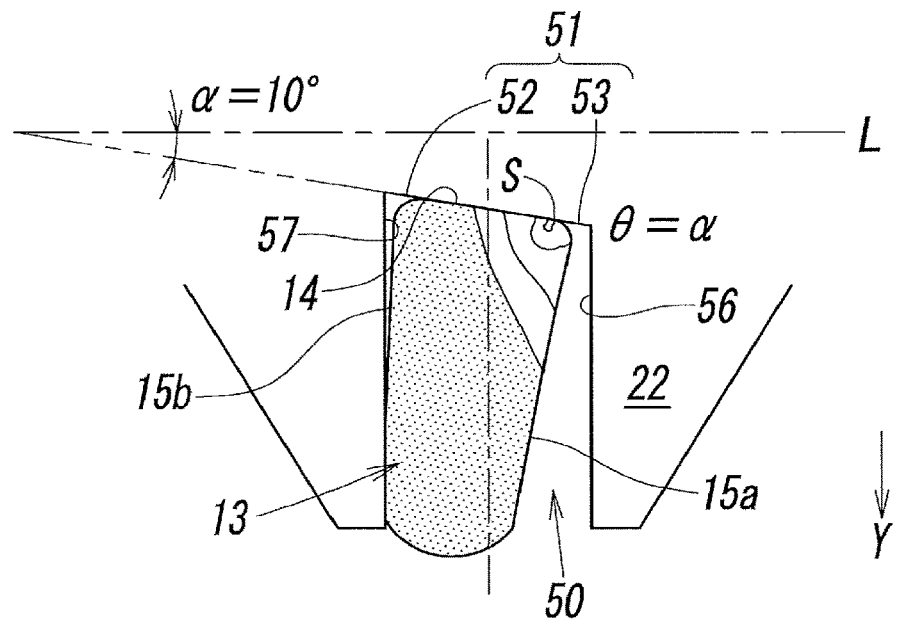
FIG. 8 illustrates simulation results on the distribution of the stress of the packing with the packing mount structure shown in FIG. 6, of which (a) illustrates a state in which the land portion is at the open position and no fluid pressure is acting, (b) illustrates a state in which the land portion is at the open position and fluid pressure is acting, and (c) illustrates a state in which the land portion is at the closed position and fluid pressure is acting.
Figure 8:
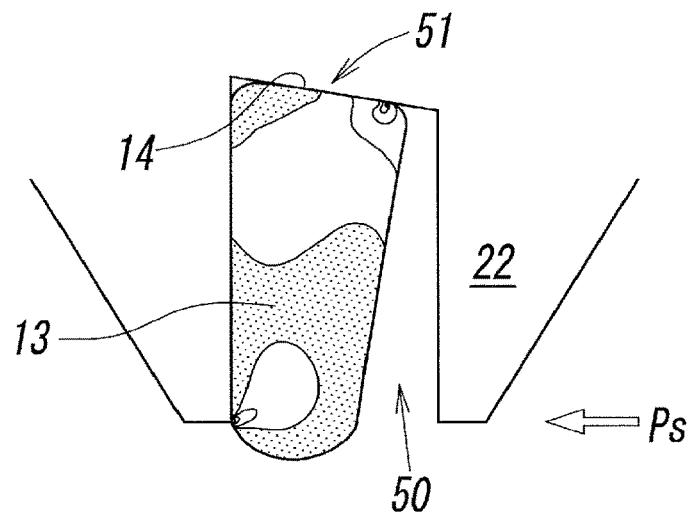
Figure 8:
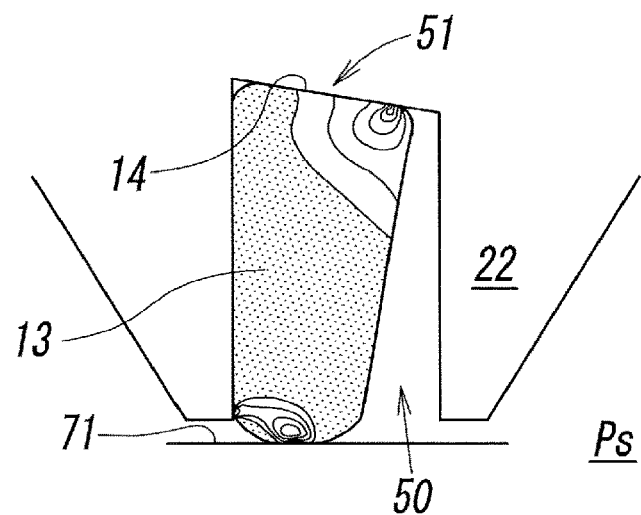

First, FIG. 8 illustrates an embodiment in which both of the inclination angle α of the inclined surface 52 of the groove bottom 51 and the inclination angle θ of the connection surface 53 are 10°. (a) in which no fluid pressure is acting on the packing 13 shows that stress concentration occurs at the inner periphery of the packing 13 at the pressure contact point S of the groove bottom 51, so that the inner periphery 14 is brought into pressure-contact with the pressure contact point S with the maximum value of contact pressure. In both of (b) and (c) in which the fluid pressure is acting on the packing 13, the pressure-contact between the inner periphery 14 and the groove bottom 51 is maintained, and the inner periphery 14 does not rise from the groove bottom 51. In fact, the largest contact pressure which is larger than that in (a) acts in (b). In other words, the concentrated contact pressure with the maximum value generated at the pressure contact point S of (a) prevents the compressed fluid from flowing between the inner periphery 14 of the packing 13 and the groove bottom 51.

Figure 9:
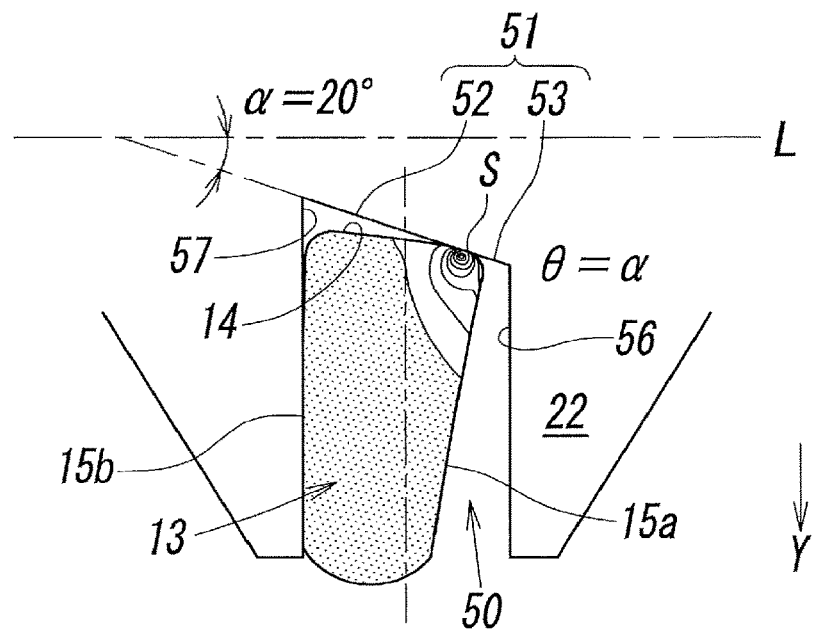
FIG. 9 illustrates other simulation results on the distribution of the stress of the packing with the packing mount structure shown in FIG. 6.
Figure 9:
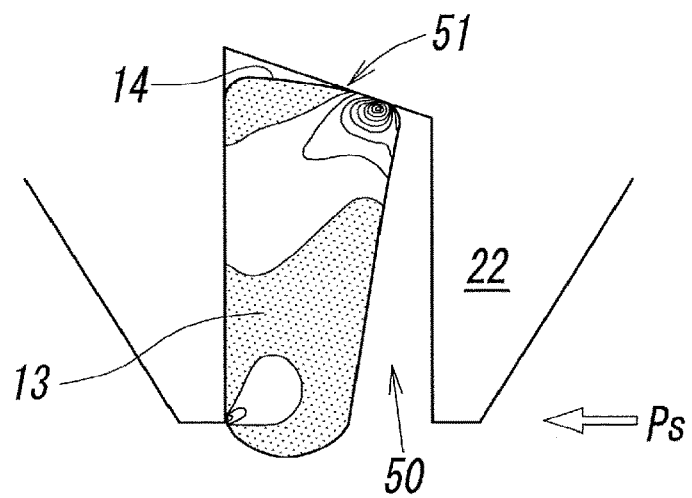
Figure 9:
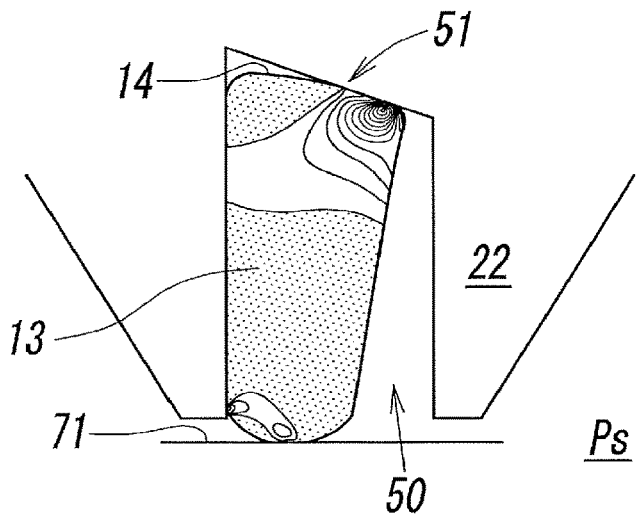

Next, FIG. 9 illustrates an embodiment in which both of the inclination angle α of the inclined surface 52 of the groove bottom 51 and the inclination angle θ of the connection surface 53 are 20°. (a) in which no fluid pressure is acting on the packing 13 shows that stress concentration larger than that of FIG. 8 occurs at the inner periphery of the packing 13 at the pressure contact point S of the groove bottom 51, so that the inner periphery 14 is brought into pressure-contact with the pressure contact point S with the maximum value of larger contact pressure. In both of (b) and (c) in which the fluid pressure is acting on the packing 13, as in FIG. 8, the pressure-contact between the inner periphery 14 and the groove bottom 51 is maintained, and the inner periphery 14 does not rise from the groove bottom 51. Also in this case, the maximum contact pressure which is larger than that in (a) acts in (b). In other words, the larger concentrated contact pressure with the maximum value generated at the pressure contact point S of (a) prevents the compressed fluid more strongly from flowing between the inner periphery 14 of the packing 13 and the groove bottom 51. The pressure contact acting between the packing 13 and the valve seat surface 71 is also reduced as compared with that in FIG. 12(c).

Figure 10:
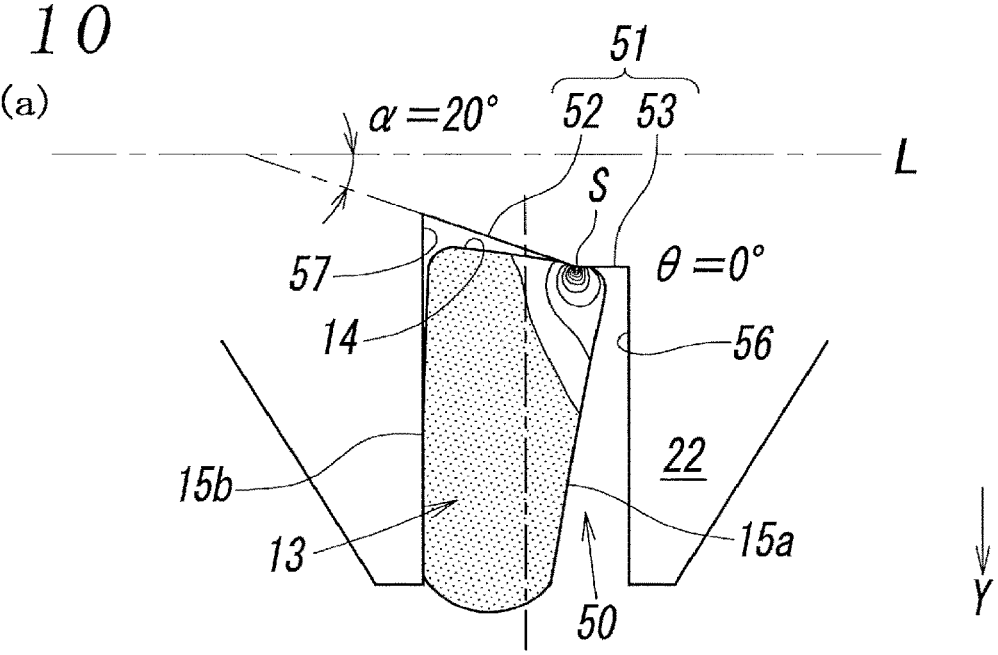
FIG. 10 illustrates simulation results on the distribution of the stress of the packing with the packing mount structure shown in FIG. 7.
Figure 10:
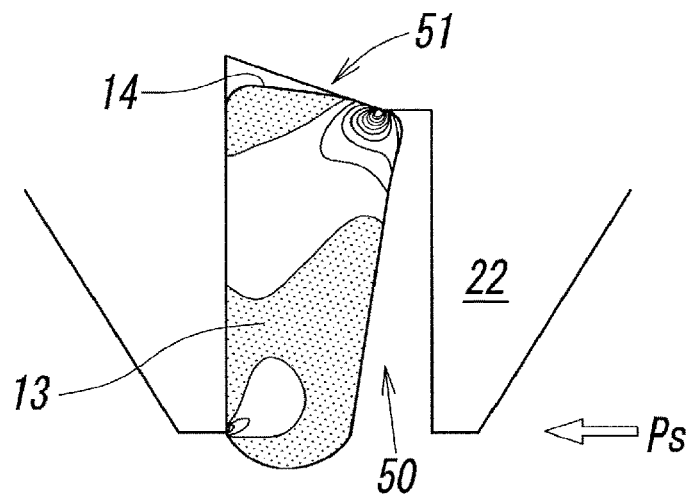
Figure 10:
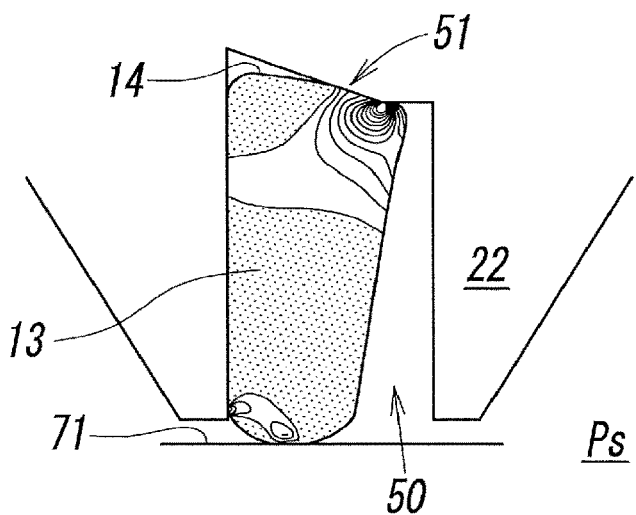

FIG. 10 illustrates an embodiment in which the inclination angle α of the inclined surface 52 of the groove bottom 51 is 20°, the inclination angle θ of the connection surface 53 is 10°, and the axial length W1 of the inclined surface 52 is three fourth of the groove width Wg of the recessed groove 50. (a) in which no fluid pressure is acting on the packing 13 shows that stress concentration larger than that of FIG. 8 occurs at the inner periphery of the packing 13 at the pressure contact point S of the bending point of the groove bottom 51, so that the inner periphery 14 is brought into pressure-contact with the pressure contact point S with the maximum value of larger contact pressure. In both of (b) and (c) in which the fluid pressure is acting on the packing 13, the pressure-contact between the inner periphery 14 and the groove bottom 51 is maintained, and the inner periphery 14 does not rise from the groove bottom 51. Also in this case, the largest contact pressure which is larger than that in (a) acts in (b). In other words, the larger concentrated contact pressure with the maximum value generated at the pressure contact point S of (a) prevents the compressed fluid more strongly from flowing between the inner periphery 14 of the packing 13 and the groove bottom 51. The pressure contact acting between the packing 13 and the valve seat surface 71 is also reduced as compared with FIG. 12(c), as in FIG. 9(c).

Figure 11:
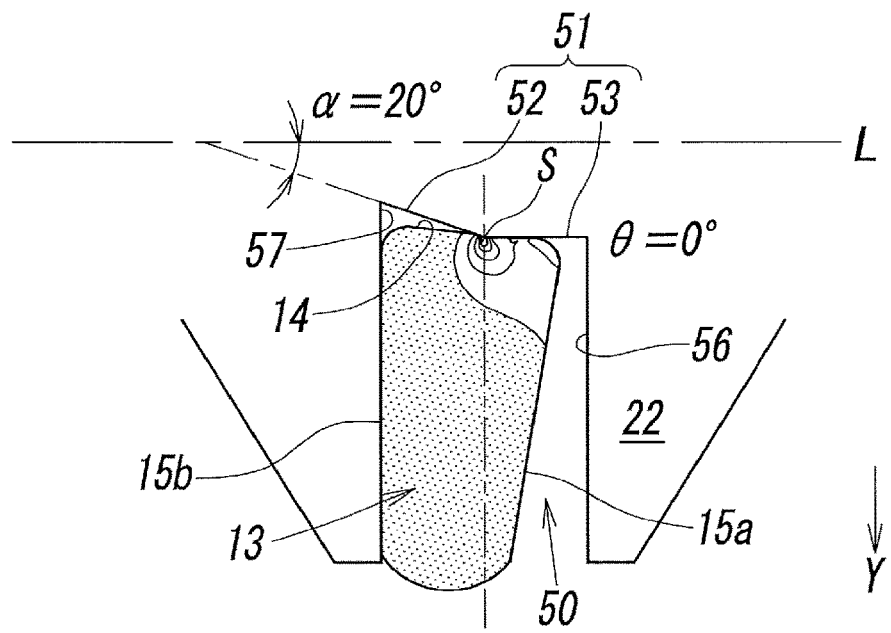
FIG. 11 illustrates other simulation results on the distribution of the stress of the packing with the packing mount structure shown in FIG. 7.
Figure 11:
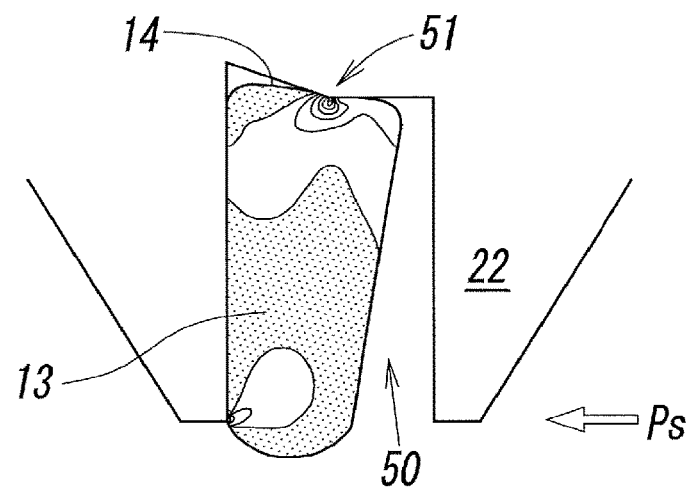
Figure 11:
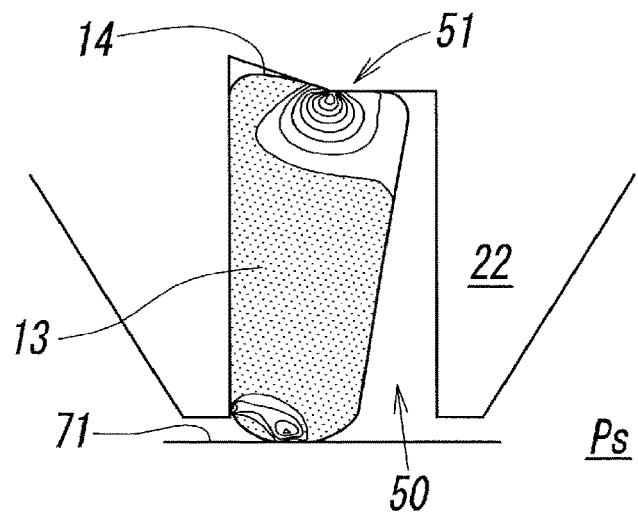

FIG. 11 illustrates an embodiment in which the inclination angle α of the inclined surface 52 of the groove bottom 51 is 20°, the inclination angle θ of the connection surface 53 is 0°, and the axial length W1 of the inclined surface 52 is one half of the groove width Wg of the recessed groove 50. (a) in which no fluid pressure is acting on the packing 13 shows that stress concentration larger than that of FIG. 8 occurs at the inner periphery of the packing 13 at the pressure contact point S of the bending point of the groove bottom 51, so that the inner periphery 14 is brought into pressure-contact with the pressure contact point S with the maximum value of larger contact pressure. In both of (b) and (c) in which the fluid pressure is acting on the packing 13, the pressure-contact between the inner periphery 14 and the groove bottom 51 is maintained, and the inner periphery 14 does not rise from the groove bottom 51. Also in this case, the largest contact pressure which is larger than that in (a) acts in (b). In other words, the larger concentrated contact pressure with the maximum value generated at the pressure contact point S of (a) prevents the compressed fluid more strongly from flowing between the inner periphery 14 of the packing 13 and the groove bottom 51, as in FIGS. 9 and 10.

Figure 12:
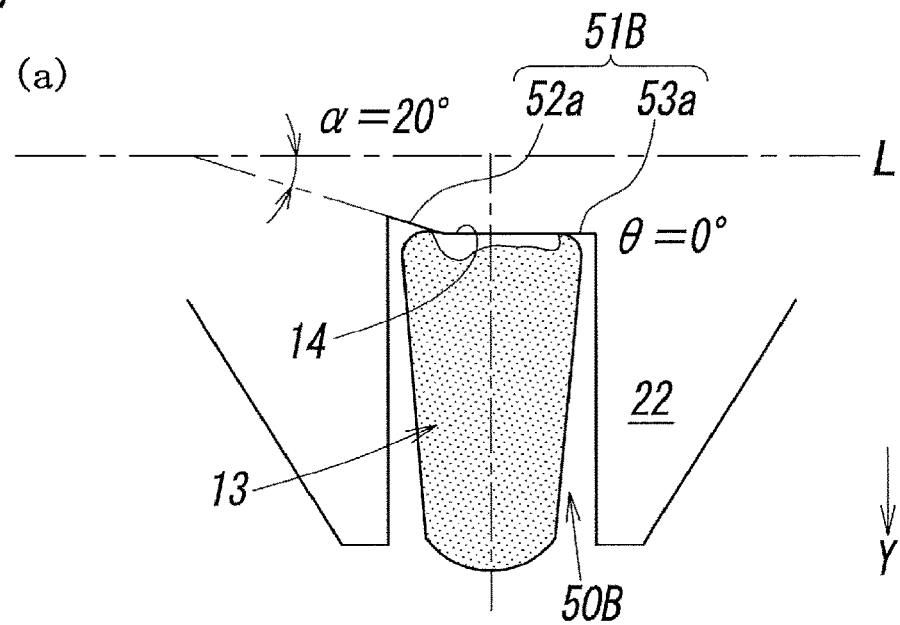
FIG. 12 illustrates reference simulation results on the distribution of the stress of the packing.
Figure 12:
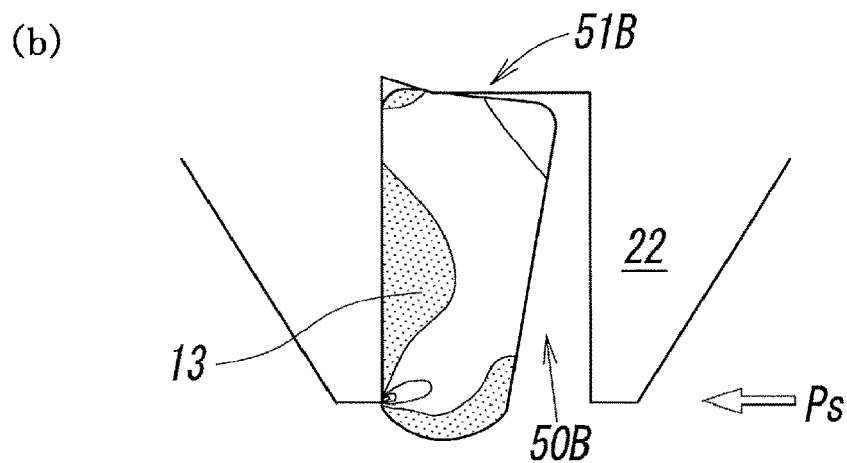
Figure 12:
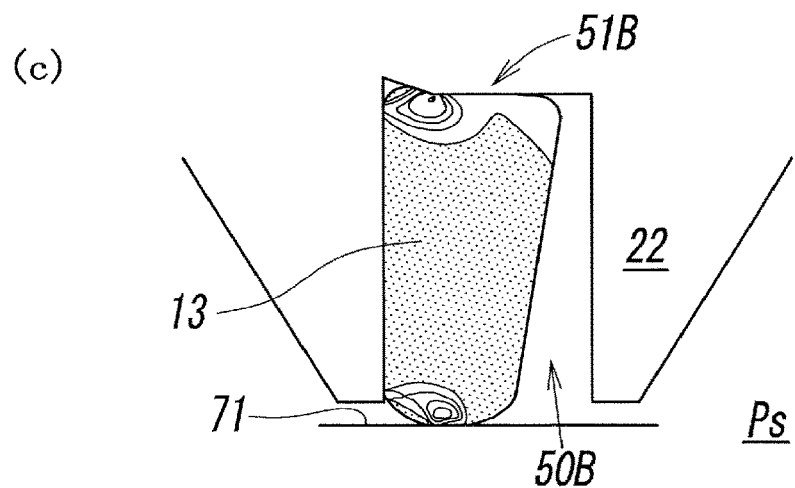

FIG. 12 illustrates a reference example in which the inclination angle α of an inclined surface 52a of a groove bottom 51B of a recessed groove 50B is 20°, the inclination angle θ of a connection surface 53a is 0°, and the axial length W1 of the inclined surface 52a is one fourth of the groove width Wg of the recessed groove 50B. In this case, as in the conventional example of FIG. 13, (a) in which no fluid pressure is acting on the packing 13 shows that the inner stress generated at the inner periphery 14 of the packing 13, that is, the contact pressure acting on the inner periphery 14 from the groove bottom 51B is dispersed substantially uniformly over the entire width to become small. For that reason, in (b) in which the fluid pressure of the compressed fluid acts on the packing 13, the compressed fluid flows between the inner periphery 14 and the groove bottom 51B to rise the inner periphery 14 from the groove bottom 51B. This may cause the packing 13 to come off the recessed groove 50B, for example, in the process of displacement of the land portion 22 from the open position to the closed position, as in the conventional example of FIG. 13.

The above simulation results show that the inclination angle α of the inclined surface 52 is preferably 10° or larger, and more preferably 20° or larger. The length W1 of the inclined surface 52 in the direction of the axis L is preferably one half or larger of the groove width Wg, and more preferably three fourth or larger of the groove width Wg.

Having described an embodiment of the spool-type switching valve according to the present invention, it is needless to say that the present invention is not limited to the embodiments and that various design changes are possible without departing from the scope of the claims.

In the embodiments, the groove bottoms 51 of all of the recessed grooves 50 of the first to fourth land portions 22, 24, 26, and 28 have the inclined surface 52. Alternatively, only the groove bottoms 51 of the first and fourth land portions 22 and 28 from which the packing 13 tends to come off may have the inclined surface 52.

The second end 52b of the inclined surface 52 need not necessarily be defined by the downstream end 55 of the groove bottom 51.

The outside diameter Dp of the packing 13 mounted in the recessed groove 50 may be slightly smaller than the diameter of the valve seat surface, and the sealing surface 16 may be brought into contact with the valve seat surface by deformation due to fluid pressure.

REFERENCE SIGNS LIST

1 SPOOL-TYPE SWITCHING VALVE (ELECTROMAGNETIC VALVE)

2 VALVE MAIN ELEMENT
3 FIRST ADAPTOR
4 SECOND ADAPTOR
5 VALVE DRIVE MEMBER (ELECTROMAGNETIC PILOT VALVE)
6 HOUSING
7 SPOOL HOLE
8 AIR SUPPLY CHANNEL
9 FIRST OUTPUT CHANNEL
10 SECOND OUTPUT CHANNEL
11 FIRST EXHAUST CHANNEL
12 SECOND EXHAUST CHANNEL
13 PACKING
14 INNER PERIPHERY OF PACKING
15A UPSTREAM SIDE
15B DOWNSTREAM SIDE
16 SEALING SURFACE
20 SPOOL
21 FIRST RING-SHAPED RECESS (SMALL-DIAMETER PORTION)
22 FIRST LAND PORTION
23 SECOND RING-SHAPED RECESS (SMALL-DIAMETER PORTION)
24 SECOND LAND PORTION
25 THIRD RING-SHAPED RECESS (SMALL-DIAMETER PORTION)
26 THIRD LAND PORTION
27 FOURTH RING-SHAPED RECESS (SMALL-DIAMETER PORTION)
28 FOURTH LAND PORTION
29 FIFTH RING-SHAPED RECESS (SMALL-DIAMETER PORTION)
30 FIRST CYLINDER HOLE
31 FIRST PISTON
40 SECOND CYLINDER HOLE
51 SECOND PISTON
50 RECESSED GROOVE FOR MOUNTING PACKING
51 GROOVE BOTTOM
52 INCLINED SURFACE
α ANGLE OF INCLINED SURFACE
53 CONNECTION SURFACE
θ ANGLE OF CONNECTION SURFACE
54 UPSTREAM END
55 DOWNSTREAM END
56 UPSTREAM WALL SURFACE
57 DOWNSTREAM WALL SURFACE
70 FIRST CHANNEL GROOVE (LARGE-DIAMETER PORTION)
71 FIRST VALVE SEAT SURFACE (VALVE SEAT)
72 SECOND CHANNEL GROOVE (LARGE-DIAMETER PORTION)
73 SECOND VALVE SEAT SURFACE (VALVE SEAT)
74 THIRD CHANNEL GROOVE (LARGE-DIAMETER PORTION)
75 THIRD VALVE SEAT SURFACE (VALVE SEAT)
76 FOURTH CHANNEL GROOVE (LARGE-DIAMETER PORTION)
77 FOURTH VALVE SEAT SURFACE (VALVE SEAT)
78 FIFTH CHANNEL GROOVE (LARGE-DIAMETER PORTION)
A FIRST OUTPUT PORT
B SECOND OUTPUT PORT
P AIR SUPPLY PORT
EA FIRST EXHAUST PORT
EB SECOND EXHAUST PORT
D0 INSIDE DIAMETERS OF VALVE SEAT SURFACE AND SUPPORT SURFACE
D1, D2 INSIDE DIAMETER OF CHANNEL GROOVE (LARGE-DIAMETER PORTION)
D3 OUTSIDE DIAMETER OF AND PORTION
D4 OUTSIDE DIAMETER OF RING-SHAPED RECESS (SMALL-DIAMETER PORTION)
D5 ORIGINAL INSIDE DIAMETER OF PACKING
Dp OUTSIDE DIAMETER OF PACKING MOUNTED IN RECESSED GROOVE
Ds GROOVE BOTTOM DIAMETER AT PRESSURE CONTACT POINT S
S PRESSURE CONTACT POINT
Wp WIDTH OF PACKING IN CROSS SECTION
Wg WIDTH OF RECESSED GROOVE IN CROSS SECTION
W1 AXIAL LENGTH OF INCLINED SURFACE OF GROOVE BOTTOM
W2 AXIAL LENGTH OF CONNECTION SURFACE OF GROOVE BOTTOM
L AXIS
Y RADIAL DIRECTION

The invention claimed is:

1. A spool-type switching valve, comprising:
a spool hole extending in an axial direction to which at least a pair of channels through which compressed fluid flows is connected; a spool inserted in the spool hole so as to be movable in the axial direction; and a valve drive member that operates the spool in the axial direction to switch a state of communication between the channels,
wherein the spool includes a land portion including a ring-shaped sliding portion around an outer periphery about an axis and a small-diameter portion smaller in outside diameter than the land portion next to each other in the axial direction,
wherein the sliding portion of the land portion has a ring-shaped recessed groove that is open in a radial direction, and a ring-shaped packing made of an elastic material is housed in the recessed groove,
wherein, in an inner surface of the spool hole, a ring-shaped valve seat at which the land portion is fitted slidably in the axial direction, with the sliding portion facing the inner surface, and a ring-shaped large-diameter portion that is larger in inside diameter than the valve seat are formed next to each other in the axial direction, and the pair of channels are connected to opposite sides of the valve seat in the axial direction,
wherein communication between the pair of channels can be switched by an operation of the spool between a state in which the land portion is disposed at the large-diameter portion and the small-diameter portion is disposed at the valve seat so that the pair of channels communicate with each other and a state in which the land portion is disposed at the valve seat so that the communication between the pair of channels is blocked,
wherein the ring-shaped recessed groove includes a groove bottom and a pair of side wall surfaces, wherein the groove bottom includes an upstream end disposed at, of the pair of channels, a channel through which compressed fluid flows into the spool hole in the axial direction and a downstream end disposed at a channel through which the compressed fluid flows out of the spool hole when the pair of channels communicate with each other, and
wherein the pair of side wall surfaces are vertically erected from the upstream end and the downstream end of the groove bottom and opposed to each other, wherein the groove bottom of the recessed groove includes an inclined surface having an axial length at least half as long as an axial length of the groove bottom and the inclined surface continuously decreases in diameter from the upstream end to the downstream end, wherein an inner periphery of the packing is brought into pressure-contact with the groove bottom with stress concentration at a pressure contact point that defines an end at the upstream end of the inclined surface, wherein an angle θ that a connection surface connecting the pressure contact point and the upstream end of the groove bottom forms with the axis is within a range of $0° \leq \theta \leq \alpha$, where α is an angle that the inclined surface forms with the axis, and wherein the inner periphery of the packing has a linear shape parallel to the axis in a cross section of the packing in a state not mounted in the recessed groove.

2. The spool-type switching valve according to claim 1, wherein the inclined surface and the connection surface of the groove bottom are linear in a cross section of the recessed groove.

3. The spool-type switching valve according to claim 1, wherein the angle α that the inclined surface forms with the axis is within a range of $10° \leq \alpha$.

4. The spool-type switching valve according to claim 1, wherein the inner periphery of the packing is in pressure-contact with the pressure contact point of the groove bottom at a portion adjacent to the upstream end with respect to a center of the groove bottom.

5. The spool-type switching valve according to claim 1, wherein the packing includes a pair of opposing side surfaces connected to opposite ends of the inner periphery in a width direction, and wherein, in the recessed groove, of the pair of side surfaces of the packing, a downstream side surface disposed at the downstream end is normally in contact with a downstream wall surface vertically erected from the downstream end of the groove bottom of the pair of side wall surfaces of the recessed groove.

6. The spool-type switching valve according to claim 1, wherein the cross section of the packing not mounted in the recessed groove is symmetrical about a center line extending in a radial direction through a center of the inner periphery.

7. The spool-type switching valve according to claim 6, wherein a pair of side surfaces of the packing has a linear shape that gradually comes close to the center line with a decreasing distance from the inner periphery to an outer periphery in the cross section of the packing not mounted in the recessed groove.

8. The spool-type switching valve according to claim 1, wherein the pair of side wall surfaces of the recessed groove extend in a direction orthogonal to the axis.

9. The spool-type switching valve according to claim 1, wherein an outside diameter of the packing is equal to or larger than an inside diameter of the valve seat of the spool hole in a state in which the packing is mounted in the recessed groove.

10. The spool-type switching valve according to claim 1, wherein the channels connected to the spool include an air supply channel, an output channel, and an exhaust channel, wherein the output channel is connected between the air supply channel and the exhaust channel in the axial direction, and wherein, of the channels, the pair of channels are the output channel and the exhaust channel, wherein the output channel is an upstream channel through which the compressed fluid flows into the spool hole, and the exhaust channel is a downstream channel through which the compressed fluid flows out of the spool hole.

* * * * *